(12) United States Patent
Whitehead

(10) Patent No.: US 12,359,117 B2
(45) Date of Patent: Jul. 15, 2025

(54) REUSABLE PHOTOLUMINESCENT APPARATUS, METHODS, AND SYSTEMS

(71) Applicant: NYOKA DESIGN CORP., Victoria (CA)

(72) Inventor: Paige Whitehead, Courtenay (CA)

(73) Assignee: Nyoka Design Corp., Vancouver (CA)

( * ) Notice: Subject to any disclaimer, the term of this patent is extended or adjusted under 35 U.S.C. 154(b) by 0 days.

(21) Appl. No.: 18/688,574

(22) PCT Filed: Nov. 23, 2021

(86) PCT No.: PCT/CA2021/051664
§ 371 (c)(1),
(2) Date: Mar. 1, 2024

(87) PCT Pub. No.: WO2023/028688
PCT Pub. Date: Mar. 9, 2023

(65) Prior Publication Data
US 2024/0392182 A1     Nov. 28, 2024

Related U.S. Application Data

(60) Provisional application No. 63/239,710, filed on Sep. 1, 2021.

(51) Int. Cl.
*C09K 11/02*     (2006.01)
*A44C 5/00*      (2006.01)
(Continued)

(52) U.S. Cl.
CPC ............ *C09K 11/02* (2013.01); *A44C 5/0007* (2013.01); *C09K 11/565* (2013.01); *C09K 11/58* (2013.01);
(Continued)

(58) Field of Classification Search
CPC ........ C09K 11/02; C09K 11/565; C09K 11/58; C09K 11/643; C09K 11/7721;
(Continued)

(56) References Cited

U.S. PATENT DOCUMENTS 3,861,072 A    1/1975 Holcombe
3,921,328 A   11/1975 Holcombe
(Continued)

FOREIGN PATENT DOCUMENTS

CA    2394988 A1    6/2001
CA    2165379 C     9/2001
(Continued)

OTHER PUBLICATIONS

Dan Ebenal, "UVic student aglow over new invention" Jan. 14, 2018, 3 pages, Victoria News.
(Continued)

*Primary Examiner* — Bao Q Truong

(57) ABSTRACT

One aspect of this disclosure is a photoluminescent apparatus comprising a body made from a glow medium comprising a photoluminescent material and a biocompatible silicone, the photoluminescent material being hosted in and rechargeable through the biocompatible silicone, a total mass of the body comprising a concentration of the photoluminescent material greater than 20% and less than 50%. Related apparatus, kits, methods, and systems also are described.

20 Claims, 19 Drawing Sheets

(51) Int. Cl.
*C09K 11/56* (2006.01)
*C09K 11/58* (2006.01)
*C09K 11/64* (2006.01)
*C09K 11/77* (2006.01)
*F21V 9/32* (2018.01)
*F21Y 113/13* (2016.01)
*F21Y 115/10* (2016.01)

(52) U.S. Cl.
CPC ........ *C09K 11/643* (2013.01); *C09K 11/7721* (2013.01); *C09K 11/7728* (2013.01); *F21V 9/32* (2018.02); *F21Y 2200/15* (2015.01); *F21Y 2113/13* (2016.08); *F21Y 2115/10* (2016.08)

(58) Field of Classification Search
CPC ... C09K 11/7728; F21V 9/32; F21V 2200/15; F21V 9/30; F21V 21/096; F21V 21/0965; A44C 5/0007; F21Y 2113/13; F21Y 2115/10
See application file for complete search history.

(56) References Cited

U.S. PATENT DOCUMENTS

| | | | |
|---|---|---|---|
| 4,184,193 | A | 1/1980 | Heffernan et al. |
| 4,638,584 | A | 1/1987 | Lindsay |
| 5,190,366 | A | 3/1993 | World |
| 5,383,100 | A * | 1/1995 | Kikos ............... F21K 2/06 362/104 |
| 5,390,086 | A | 2/1995 | Holland |
| 5,876,995 | A | 3/1999 | Bryan |
| 6,113,886 | A | 9/2000 | Bryan |
| 6,152,358 | A | 11/2000 | Bryan |
| 6,232,107 | B1 | 5/2001 | Bryan et al. |
| 6,247,995 | B1 | 6/2001 | Bryan |
| 6,521,304 | B1 | 2/2003 | Kajiyama et al. |
| 6,572,244 | B1 | 6/2003 | Clark |
| 6,663,255 | B1 | 12/2003 | Carito |
| 6,840,648 | B2 * | 1/2005 | Bryant ............... G09F 21/02 63/3.1 |
| 7,052,631 | B2 | 5/2006 | Cranor |
| 7,074,345 | B2 | 7/2006 | Saito et al. |
| 7,109,315 | B2 | 9/2006 | Bryan et al. |
| 7,252,401 | B1 | 8/2007 | Plaszcz |
| 8,128,839 | B2 | 3/2012 | Xu |
| 8,282,858 | B2 | 10/2012 | Agrawal et al. |
| 8,833,954 | B2 * | 9/2014 | Griffin ............... F21V 9/30 362/84 |
| 2005/0158526 | A1 | 7/2005 | Ino et al. |
| 2006/0053505 | A1 | 3/2006 | Bryan |
| 2008/0103232 | A1 | 5/2008 | Lake et al. |
| 2009/0289237 | A1 | 11/2009 | Cranor |
| 2013/0208444 | A1 | 8/2013 | Green |
| 2013/0273554 | A1 | 10/2013 | Manion |
| 2014/0003026 | A1 | 1/2014 | Friedson |
| 2014/0104810 | A1 | 4/2014 | Ford et al. |
| 2014/0192512 | A1 | 7/2014 | Bushee |
| 2015/0233531 | A1 | 8/2015 | Nagel |
| 2020/0109089 | A1 * | 4/2020 | Saleem ............... C04B 14/303 |
| 2021/0087464 | A1 | 3/2021 | Whitehead |

FOREIGN PATENT DOCUMENTS

| | | |
|---|---|---|
| CA | 2245594 C | 4/2003 |
| CA | 2358376 A1 | 4/2003 |
| CA | 2349160 C | 11/2004 |
| CA | 2261679 C | 11/2005 |
| CA | 2622816 A1 | 3/2007 |
| CA | 2194325 C | 11/2007 |
| CA | 2670527 A1 | 6/2008 |
| CA | 2699604 A1 | 4/2009 |
| CA | 2253797 C | 8/2009 |
| CA | 2417284 C | 11/2009 |
| CA | 2733512 A1 | 2/2010 |
| CA | 2960058 C | 5/2019 |
| CN | 2914660 Y | 6/2007 |
| CN | 200983799 Y | 12/2007 |
| CN | 101238802 A | 8/2008 |
| CN | 202907662 U | 5/2013 |
| CN | 107446084 A | 12/2017 |
| CN | 207476729 U | 6/2018 |
| CN | 208159886 U | 11/2018 |
| EP | 0318915 B1 | 6/1989 |
| EP | 0879383 B1 | 5/2003 |
| EP | 3563420 | 11/2019 |
| FR | 673306 A | 1/1930 |
| FR | 2683122 A1 | 5/1993 |
| JP | H0668201 U | 3/1994 |
| JP | H10276618 A | 10/1998 |
| JP | H11167801 A | 6/1999 |
| JP | 2002095396 A | 4/2002 |
| JP | 2017205192 A | 11/2017 |
| KR | 100900727 | 10/2019 |
| KR | 102106928 B1 | 5/2020 |
| WO | 1987002667 A1 | 5/1987 |
| WO | 9729319 A2 | 8/1997 |
| WO | 1997029319 A2 | 8/1997 |
| WO | 0207556 A2 | 1/2002 |
| WO | 2015120332 A1 | 8/2015 |
| WO | 2016079724 A2 | 5/2016 |
| WO | 2019213734 A1 | 11/2019 |

OTHER PUBLICATIONS

International Search Report and Written Opinion for International Patent Application No. PCT/CA2021/051664, issued May 30, 2022 (11 pages).

Jody Paterson, "Making littering feel good" Apr. 12, 2018, 4 pages, University of Victoria.

* cited by examiner

C-C

D-D

H-H

REUSABLE PHOTOLUMINESCENT APPARATUS, METHODS, AND SYSTEMS

BACKGROUND

1. Field

Aspects of the present disclosure generally relate to photoluminescent apparatus, methods, and systems. Particular aspects relate to reusable photoluminescent apparatus, methods, and systems of various shapes and sizes.

2. Description of Related Art

Chemiluminescent glow sticks, also known as "light sticks" or "light wands" or "chem lights", are utilized for emergency preparedness, events, personnel marking, as pelagic attractants, and more.

Most glow sticks have a plastic tube containing chemicals designed to produce a light-generating chemiluminescence reaction when mixed together. The chemicals may comprise a base catalyst, dyes, phosphors, peroxides, or other additives affecting a brightness, color, and/or duration of the light-generating reaction. Different chemiluminescent glow sticks having different ranges of brightness and/or durations are currently available on the market, including ultra-bright glow sticks outputting a high intensity light for around five (5) minutes and long-lasting glow sticks outputting a low intensity light for longer periods of time, such as eighteen (18) hours or more.

The chemicals utilized to produce the light-generating chemiluminescence reaction are usually toxic chemicals that cannot be recharged after being mixed together. As a result, most chemiluminescent glow sticks are single use products that are utilized once and thrown away, despite containing toxic chemicals. Over one (1) billion single use glow sticks are made and disposed of as garbage every year, making them a common form of toxic pollution and waste. Because they are often utilized as a pelagic attractant, many chemiluminescent glow sticks also pollute the ocean as well as land.

SUMMARY

One aspect of this disclosure is a photoluminescent apparatus. An exemplary apparatus may comprise a body made from a glow medium comprising a photoluminescent material and a biocompatible base material, the photoluminescent material being hosted in and rechargeable through the base material. The apparatus also may comprise a body made from a glow medium comprising a photoluminescent material and a biocompatible silicone, the photoluminescent material being hosted in and rechargeable through the biocompatible silicone. A total mass of the body may comprise a concentration of the photoluminescent material greater than 20% and less than 50%.

The body may consist of the glow medium. The glow medium may consist of the photoluminescent material and the biocompatible silicone. The glow medium may consist essentially of the photoluminescent material and the biocompatible silicone, meaning those elements and any others that do not materially affect the basic and novel characteristic(s) of the apparatus. Because of material properties of the biocompatible silicone, a total mass of the body may comprise a concentration of the photoluminescent material equal to the range noted above, or between 20% and approximately 50%, or between approximately 25% and approximately 45%, or approximately 36.5%, or any other range described herein.

The photoluminescent material may comprise a member of the strontium aluminate family. The photoluminescent material may comprise zinc copper sulfides. The zinc copper sulfides may comprise ZnS and Cu:ZnS. The photoluminescent material may comprise one or more of: Eu:SrAl2O4; SrAL2O4; Dy:Eu:SrAl2O4; SrAl4O7; Sr3Al2O6; SrAl12O19; Sr4Al14O25; Eu2+:SrAl2O4; Eu2+:SrAl2O4·Eu2+, Dy3+; Sr0.95Ce0.05Mg0.05Al11.95O19; and/or any equivalent materials. The photoluminescent material may comprise strontium aluminates doped with europium and dysprosium to produce an optimum excitation wavelength ranging from 100 nm to 400 nm and an emission wavelength ranging from 420 nm to 520 nm.

The biocompatible silicone may comprise a silicone rubber, including any type of food- or medical-grade silicone, any type of class IV silicone, and/or any equivalent silica-containing biocompatible material. The biocompatible silicone may have a Durometer value of between Shore A 30 and Shore A 70 on the Durometer Scale.

The body may comprise a continuous circular shape that is resiliently expandable to receive another object, such as an arm. The body may comprise a coil shape. The body may comprise an elongated shape extending between a first end and a second end. A central portion of the elongated shape may taper toward the first end and the second end. The elongated shape may comprise a circular cross section extending between the first end and the second end. The body may support its own weight when cantilevered outwardly from the first end or the second end. The body may be flexible enough to be wrapped around another object, such as an arm or neck.

A first end of the body may comprise a first connector. A second end of the body comprises a second connector. The first connector may be removably attachable to the second connector. The first connector may be magnetically and/or threadedly attachable with the second connector. The first connector may comprise male portion, the second connector may comprise a female portion, and the male portion may be receivable in the female portion. The first connector may comprise a first part of a watch band and the second connector may comprise a second part of the watch band. The body may comprise a printable surface and/or a microchip. For example, the body may comprise a generally rectangular cross section and the printable surface may be defined by a planar portion of the generally rectangular cross section. The microchip may comprise an RFID chip and/or be contained in the body.

Any a photoluminescent apparatus described herein may comprise a channel extending through the body. The body of any apparatus described herein may comprise: a first end with a first end opening; a second end with a second end opening; an elongated shape extending between the first end and the second end; and a channel that extends through elongated shape and is communication with first end opening and the second end opening. The body may have a longitudinal axis and the elongated shape may extend between the first end and the second end along the longitudinal axis. The first end opening and/or the second end opening may be approximately coaxial with the longitudinal axis. The apparatus may comprise an element receivable in the channel. The apparatus may be formable into a symbolic shape and/or mountable on a supporting structure by deforming the element. The element may comprise a wire, such as a shape memory wire. Interior surfaces of the channel may be coated with a lubricating agent operable with the element to prevent damage of the elongated body when moved relative to the element. The apparatus may comprise an adhesive that is located in the channel and operable to limit movements of the elongated body relative to the element.

Another aspect of this disclosure is a photoluminescent system. An exemplary system may comprise a plurality of any photoluminescent apparatus described herein. Each photoluminescent apparatus of the plurality of photoluminescent apparatus may be formable into a symbolic shape. Each apparatus of the plurality of photoluminescent apparatus may comprise a channel extending through its body and a deformable element mounted in the channel. The deformable element may comprise a wire and/or other deformable structure. The symbolic shape may comprise a symbol or a letter and/or be mountable to a support structure.

Another aspect of this disclosure is a photoluminescent kit. An exemplary kit may comprise: any photoluminescent apparatus described herein, wherein the body is formable into a symbolic shape and mountable on a supporting structure; attachment elements; and instructions for forming the symbolic shape and mounting the body to a supporting structure with the attachment elements. Another exemplary kit may comprise: a length of a body of any photoluminescent apparatus described herein as comprising a channel extending through its body along the length; a length of a deformable element that is receivable in the channel; and instructions for forming a plurality of symbolic shapes from portions of the length of the body and portions of the length of the deformable element.

Any photoluminescent apparatus described herein may comprise an optical fiber extending through the body. the apparatus may comprise a channel extending through the body and an optical fiber extending through the channel. The apparatus may comprise a light source selectively operable to direct a light into a core of the optical fiber through an end face of the fiber. The light source may comprise an LED.

The light source may comprise an UV-LED operable to charge the photoluminescent material. The LED may comprise an RGB LED selectively operable to change a color of the body. A first end of the body may comprise a first connector, a second end of the body comprises a second connector, the first connector may be removably attachable to the second connector, and the light source may be located in the first connector, aligned with a first end face of the core of the optical fiber, and selectively operable to direct the light into the first end face. The apparatus may comprise a reflector operable to reflect a portion of the light back into the core of the optical fiber. The reflector may be located in the second connector, aligned with a second end face of the core optical fiber, and operable to reflect the portion of the light into the second end face. The light source may comprise a second light source that is located in the second connector and aligned with a second end face of optical fiber. Each of the light source and the second light source may comprise an LED.

Any glow medium described herein may comprise a fluorescent material. The fluorescent material may comprise a fluorescent whitening agent (or "FWA") and/or a chromatic colorant. The fluorescent material may be operable to alter a whiteness or brightness of the body when exposed to light. The fluorescent material may be operable to transform a wavelength of light applied to the elongated body into an optimum excitation wavelength of the photoluminescent material. The fluorescent material may alter an emission spectrum of the photoluminescent material.

Another aspect of this disclosure is a method of making a photoluminescent apparatus. An exemplary method may comprise steps of: combining a photoluminescent material with a biocompatible silicone to make a glow medium having a concentration of the photoluminescent material that is greater than 20% and less than 50% of a total mass of the glow medium; allowing the glow medium to set over a period of time; forming the glow medium into a general shape of a body; trimming the general shape into a particular shape of the body; and/or activating the photoluminescent material in the biocompatible silicone.

The method may comprise adding materials to the glow medium. The step of allowing the glow medium to set may comprise placing the glow medium into a form and exposing the glow to ambient conditions while in the form. The step of allowing the glow medium to set may comprise forming a cured sheet of the glow medium. The step of forming the glow medium into a general shape of the body may comprise: passing the cured sheet through an extruder; and outputting, from the extruder, a strip of cured glow medium. The method may comprise cutting the strip of cured glow medium to a desired length. The step of trimming the general shape into the particular shape may comprise removing portions of the strip of cured glow medium.

The method may comprise pulling the strip of cured glow medium through a tube to make a modified strip having a channel extending therethrough and cutting the modified strip to a desired length. The step of trimming the general shape into the particular shape may comprises removing portions of the modified strip. The method may comprise locating an element in the channel, such as an optical fiber extending through the channel. The step of activating the photoluminescent material in the biocompatible silicone may comprise exposing the body to a light from a light source for a minimum charging time. At least a portion of the light may be in the UV spectrum and the minimum charging time may be greater than approximately one hour.

The method may comprise mounting a first connector to a first end of the body, mounting a second connector to a second of the body, and removably attaching the first connector to the second connector. The first connector may comprise a light source that is located in the first connector, aligned with a first end face of the core of the optical fiber, and selectively operable to direct the light into the first end face; and the method may comprise selectively operating the light source to expose interior surfaces of the channel to the light. The method may comprise reflecting a portion of the light back into the core of the optical fiber. The second connector may comprise a second light source that is located in the second connector, aligned with a second end face of the core of the optical fiber, and selectively operable to direct a second light into the second end face; and the method may comprise selectively operating the second light source to expose the interior surfaces of the channel to the second light. The light source and second light sources may be different.

Aspects of additional apparatus, kits, methods, and systems also are described.

BRIEF DESCRIPTION OF THE DRAWINGS

The accompanying drawings, which are incorporated in and constitute part of this disclosure, illustrate exemplary aspects that, together with the written descriptions, explain the principles of this disclosure. Numerous aspects are particularly described, pointed out, and taught in the written descriptions. Some structural and operational aspects may be even better understood by referencing the written portions together with the accompanying drawings, of which.

DETAILED DESCRIPTION

Figure 1:
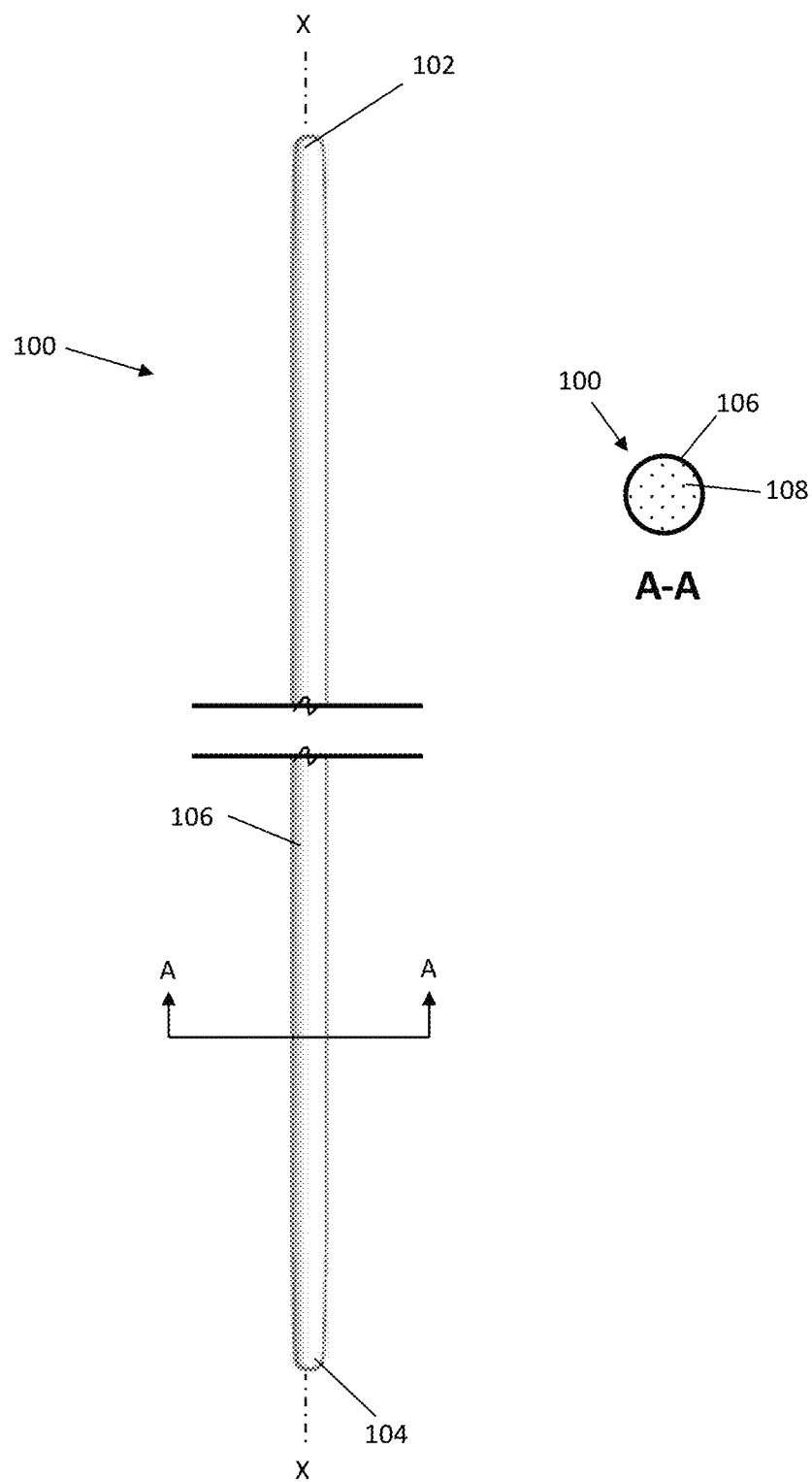
FIG. 1 depicts a side view of an exemplary photoluminescent apparatus; and indicates a section line A-A extending therethrough.

Aspects of the present disclosure are not limited to the exemplary structural details and component arrangements described in this description and shown in the accompanying drawings. Many aspects of this disclosure may be applicable to other aspects and/or capable of being practiced or carried out in various variants of use, including the examples described herein.

Throughout the written descriptions, specific details are set forth in order to provide a more thorough understanding to persons of ordinary skill in the art. For convenience and ease of description, some well-known elements may be described conceptually to avoid unnecessarily obscuring the focus of this disclosure. In this regard, the written descriptions and accompanying drawings should be interpreted as illustrative rather than restrictive, enabling rather than limiting.

Exemplary aspects of this disclosure reference reusable photoluminescent apparatus, methods, and systems. Some aspects are described with reference to a particular shape (e.g., an elongated shape), made with particular photoluminescent materials (e.g., such as rare-earth nanocrystals), and having a particular structure (e.g., one with channels and/or removably attachable ends). Unless claimed, these exemplary aspects are provided for convenience and not intended to limit the present disclosure. Accordingly, the concepts described in this disclosure may be utilized with any photoluminescent apparatus, methods, and/or systems, including those relevant to any type of glow stick.

Several reference axes may be described, including: a longitudinal axis X-X and/or a lateral axis Y-Y. Various aspects are described relative to these axes. Each longitudinal axis X-X and lateral axis Y-Y may define relative arrangements. For example, each longitudinal axis X-X may be non-parallel with at least one lateral axis Y-Y in some perspectives, meaning that axes Y-Y may extend across and/or intersect axis X-X. The term "elongated" may describe any aspect having a length along one of axes X-X or Y-Y that is longer in relation to a width along a non-parallel one of axes X-X or Y-Y. Additional axes, movements, and forces also may be described with reference to axes X-X and Y-Y. These relative terms are provided for convenience and do not limit this disclosure unless claimed.

As used herein, inclusive terms such as "comprises," "comprising," "includes," "including," and variations thereof, are intended to cover a non-exclusive inclusion, such that a photoluminescent apparatus, method, system, or element thereof comprising a list of elements does not include only those elements but may include other elements not expressly listed and/or inherent thereto. Unless stated otherwise, the term "exemplary" is used in the sense of "example," rather than "ideal." Various terms of approximation may be used in this disclosure, including "approximately" and "generally." Unless stated otherwise, approximately means within 10% of a stated number or outcome and generally means "within most cases" or "usually." For example, unless stated otherwise, the term "approximately 50%" may include any number in between 45% and 55%.

Aspects of the photoluminescent apparatus described herein may perform like chemiluminescent glow sticks, but in a form that is reusable, non-toxic, and/or recyclable. Some aspects may utilize non-toxic solid-state photoluminescent nanocrystals containing phosphors operable to produce a persistent phosphorescence after being charged by external light sources such as the sun. As described, these materials may be formed into a durable, reusable, and plastic-free structure, whether within the structure or mixed throughout as the structure. Different types of photoluminescent structures are contemplated, including the exemplary bracelet, cover, rope, and signage products described herein and depicted in FIGS. 1 to 18. The photoluminescent materials and structural forms described herein may render many traditional chemiluminescent products unnecessary, such as chemiluminescent glow sticks and related products. When fully adopted, the aspects described herein may reduce biohazardous chemical waste locally and worldwide by providing non-toxic alternatives.

Aspects of this disclosure are now described in detail with reference to an exemplary photoluminescent apparatus photoluminescent apparatus 100. As shown in FIG. 1, for example, photoluminescent apparatus 100 may comprise a first end 102, a second end 104, and a body 106 extending between ends 102 and 104 along a longitudinal axis X-X.

Body 106 may comprise a photoluminescent mixture of materials formed into shape (e.g., an elongated shape) that is durable, reusable, plastic-free, and produces a persistent phosphorescence after being charged by an external light source (e.g., the sun) for a minimum charging time. As shown in FIG. 1, for example, body 106 may comprise or be formed entirely from a "glow medium" comprising: (I) a "photoluminescent material" with non-toxic solid-state photoluminescent nanocrystals including phosphors operable to produce phosphorescence after being charged by the external light source; and (ii) a "base material" that hosts the photoluminescent material and defines a shape of body 106.

The photoluminescent material may comprise a chemical structure able to produce in a "persistent phosphorescence" meaning up to or over one (1) hour of bright glow and twelve or more (12+) hours of a continuously dimming glow. The chemical structure may comprise of any compound in the class of photoluminescent materials, including any member of strontium aluminate family, including the examples listed below and any compounds comparable thereto. By way of example, the chemical structure of photoluminescent material may comprise any variety of strontium aluminate pigment, including any of those known generally in the art as "rare-earth nanocrystals."

The chemical structure may continuously recharge when exposed to light from the external light source. As shown in FIG. 1, for the example, the photoluminescent material may recharge when exposed to sunlight for a minimum charging time of 1-2 hours, although the ideal excitation wavelength may vary depending on the properties of the photoluminescent material. After being exposed to the applied light for the minimum amount of time, because of its chemical structure, the photoluminescent material may glow at an emission wavelength over an extended time. The emission wavelength may vary based on the chemical structure. As shown in FIG. 1, for example, the photoluminescent material of body 106 may comprise strontium aluminates doped with europium and dysprosium to produce an optimum excitation wavelength ranging from 100-400 nm and an emission wavelength of 420-520 nm.

The photoluminescent material may comprise any type of strontium aluminates with any type of dopant/activator such as europium and/or dysprosium. As shown in FIG. 1, for example, the photoluminescent material may comprise a chemical structure such as SrAL2O4, Dy:Eu:SrAl2O4, SrAl4O7, Sr3Al2O6, SrAl12O19, Sr4Al14O25, Eu2+:SrAl2O4, Eu2+:SrAl2O4·Eu2+, Dy3+, and/or Sr0.95Ce0.05Mg0.05Al11.95O19. The photoluminescent material may comprise different types of zinc copper sulfides, often with a suitable dopant/activator such as copper. As shown in FIG. 1, for example, the photoluminescent material may comprise ZnS and/or Cu:ZnS. Any known or possible type of photoluminescent materials may be utilized in the manner described herein, including any photoluminescent materials that a person of ordinary skill in the art would deem interchangeable with the examples described herein.

The base material may comprise any material operable to hold the photoluminescent material, define a shape of body 106, and confer a predetermined amount of flexibility thereto. As shown in FIG. 1, for example, the base material may comprise any silicone, durable plastic, and/or biomaterial selected based on its biocompatibility, durability, flexibility, and/or environmental impact. In the FIG. 1, for example, the base material may comprise a medical grade silicone selected for its interoperability with the photoluminescent material as well as its durability, skin-safe qualities, flexibility, and low environmental impact.

The base material may comprise a chemical structure able host the photoluminescent material and retain the shape of body 106. Body 106 may be opaque or generally opaque, meaning that light cannot pass all the way through it. As shown in FIG. 1, for example, because of its chemical structure, body 106 may permit targeted wavelengths of light to charge the photoluminescent material hosted in the base material. The chemical structure may comprise any type of additives and/or additions operable to affect the flexibility of body 106 by, for example, increasing or decreasing the Durometer value of its base material. As shown in FIG. 1, for example, the base material may comprise any type of medical grade silicones and/or silicone composites, many of which are desirable for being non-reactive, skin-safe, biologically inert, non-plastic, and/or recyclable.

As shown in FIG. 1, for example, body 106 may consist of the glow medium, such that no other elements are included, meaning that body 106 includes only a first percentage of the photoluminescent material and a second percentage of the base material, in which the first and second percentages total 100%. The glow medium also may consist essentially of the photoluminescent material and the base material, meaning that body 106 may include materials relating to its manufacture but does not include any other materials affecting its glowing and/or recharging capabilities, such that first and second percentages total approximately 100%.

A total mass of body 106 may comprise a concentration of the photoluminescent material that ranges from greater than 0% to approximately 50%. As shown in FIG. 1, for example, the concentration of the photoluminescent material may be between approximately 25% and approximately 50% of the total mass of body 106, with the remainder comprising the base material. Any concentration of the photoluminescent material between greater than 0% and approximately 50% may be utilized, including any concentration having enough of the photoluminescent material to cause a targeted glow-in-the-dark effect while retaining the desired material properties of body 106. As a further example, the concentration of the photoluminescent material may be approximately 43%, or approximately 36.5%, or approximately 37%, or between 43% and 36%, or between 37% and 36.5%, approximately 25%, or any percentages approximate thereto, with the remainder comprising the base material.

Figure 2:
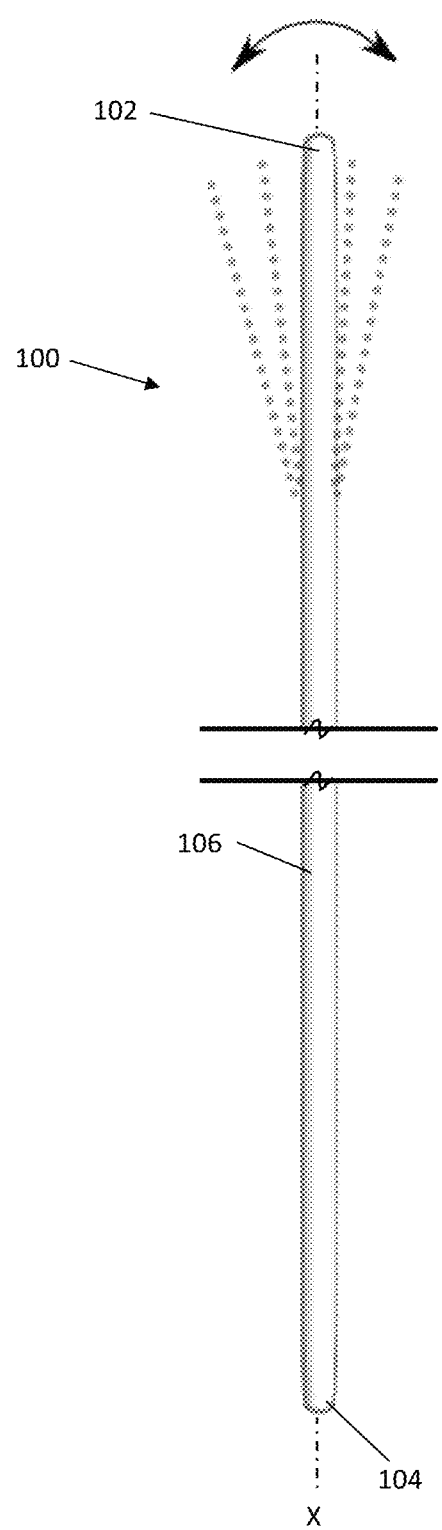
FIG. 2 depicts a side view of the FIG. 1 apparatus when flexing.

Depending on the glow medium, body 106 may comprise a durable, reusable photoluminescent apparatus having any shape, such as the elongated cylindrical shape of FIGS. 1 and 2. As shown in FIG. 1, for example, body 106 may comprise a central portion extending along a longitudinal axis X-X between a first end 102 and a second end 104. As shown in section line A-A of FIG. 1, for example, the central portion of body 106 may have a solid cross section with a circular diameter that varies along the length of body 106 to define its elongated cylindrical shape. First end 102 may be disposed opposite of second end 104 along longitudinal axis X-X. As shown in FIG. 1, each of first end 102 and second end 104 may have a semispherical shape so that body 106 is symmetrical about multiple reference axes. Any shape for ends 102, 104 may be utilized, including end surfaces that intersect and/or at right angles with axis X-X, chamfered portions, rounded edges, and the like.

Body 106 may comprise an elongated cylindrical shape of any length. As shown in FIG. 1, for example, body 106 may have a length along longitudinal axis X-X of between approximately one (1) and seventy-two (72) inches, or greater. The glow medium and cross section of body 106 may define a structural shape with material characteristics optimized to resiliently maintain the elongated cylindrical shape when cantilevered outwardly from either one of end 102 or 104. As shown in FIG. 1, for example, the length of body 106 may be equal to that of a wand having a length of between approximately 4 and 15 inches. Different shapes and sizes of body 106 may be utilized to accommodate different lengths. In keeping with FIG. 1, for example, the shape and/or size of body 106 may be: decreased to that of a pin having a length of approximately 2 to 3 inches or less; increased to that of a sword having a length of approximately 18 to 32 inches; or increased further to that of a staff or a pole having even greater lengths.

As shown in FIG. 1, for example, the elongated cylindrical shape of body 106 may taper along longitudinal axis X-X from a central portion toward the semispherical shape of ends 102 and 104. As shown in section A-A of FIG. 1, for example, body 106 may have a solid circular cross section with a variable diameter that defines the elongated cylindrical shape. As shown in FIG. 1, for example, the shape may be radially symmetrical about longitudinal axis X-X and/or a solid of revolution obtainable by rotating a plane curve around axis X-X.

The cross-sectional shape and length of body 106 may interact with material properties of the base material to define flexural characteristics of body 106. The base material may be selected to affect flexural characteristics of body 106 such as flexibility and rigidity. For example, there is a known connection between flexibility of elongated shapes (e.g., like body 106) and the Durometer value of their base material. Typically, the higher the Durometer value, the less flexible the material will be. For example, a Polyurethane tube with a Durometer value of 85 Shore A on the Durometer Scale will be more flexible than a Polyurethane tube with a Durometer value of 98 Shore A on the Scale. Body 106 may generally maintain the material properties of the base material. For example, if the base material consists of silicone rubber, then body 106 may generally maintain the material properties of silicone rubber, although its flexibility and/or hardness may vary as the percentage of photoluminescent material is increased. As shown in FIG. 1, for example, the base material of body 106 may have a Durometer value ranging from approximately Shore 00 30 to Shore D 50 on the Durometer Scale, which an exemplary body 106 with a Durometer value of Shore 00 30 on the Durometer Scale will be more flexible than an exemplary body 106 with a Durometer value of Shore D 50 on the Scale. As a further example, the base material of body 106 also may have a Durometer value ranging from approximately Shore A 30 to Shore A 70 on the Durometer Scale, which an exemplary body 106 with a Durometer value of Shore A 30 on the Durometer Scale will be more flexible than an exemplary body 106 with a Durometer value of Shore A 70 on the Scale.

As shown in FIG. 2, for example, the base material of body 106 may have a Durometer value of D 50 so that its central portion may be rigid enough to maintain the elongated cylindrical shape under its own weight and yet flexible enough to permit movement of end 102 relative to the central portion of body 106 in directions transverse with longitudinal axis X-X responsive to movement forces applied to end 104. The base material may be selected to provide body 106 with any degree of flexibility or rigidity. For example, the base material may comprise a biocompatible material having enough flexibility when mixed with the photoluminescent material to allow body 106 to be wrapped around the wrist, neck, backpack, or other device while retaining the cross-sectional shape of body 106.

Figure 19:
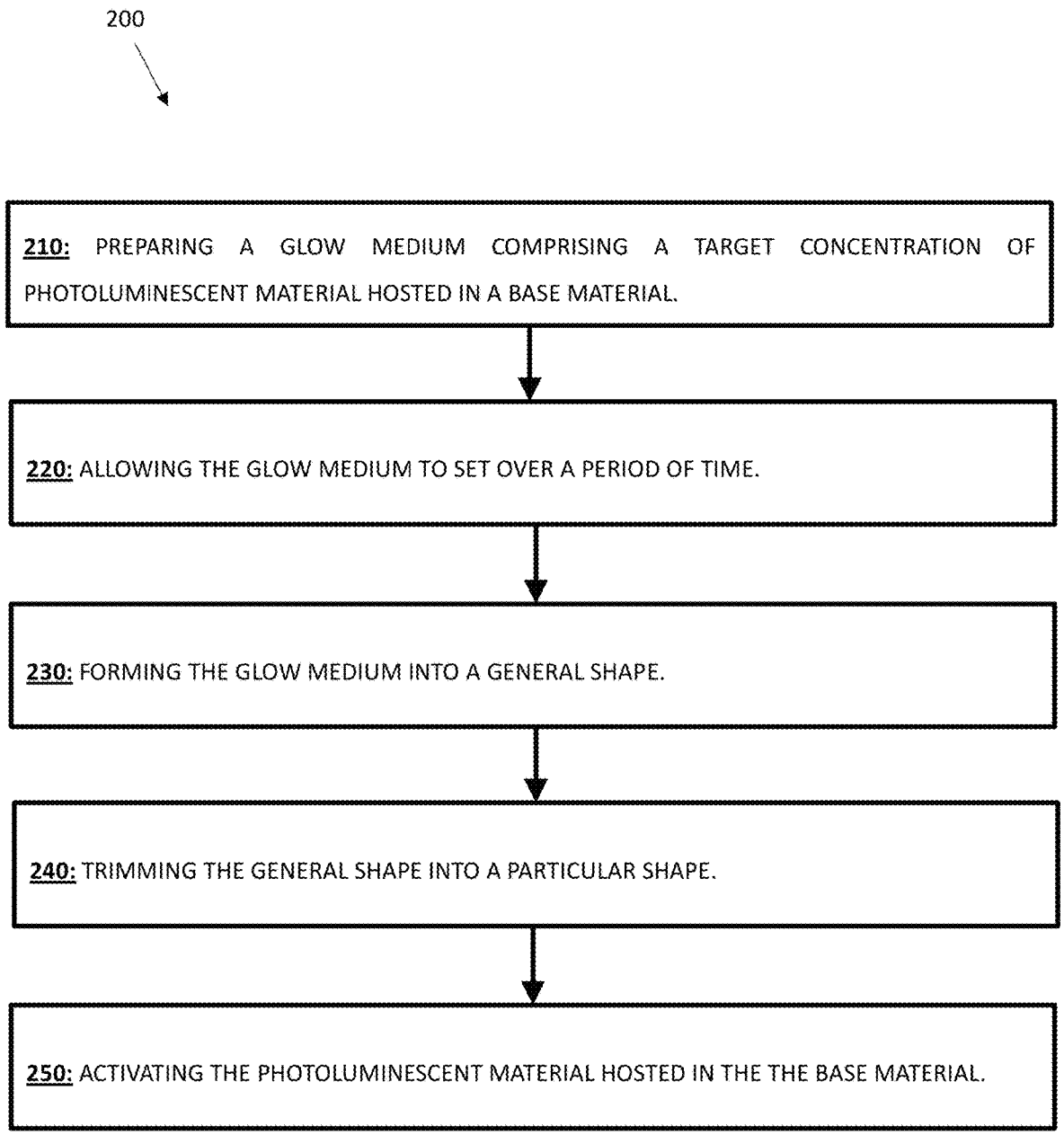
FIG. 19 depicts a set of exemplary method steps.

A method 200 of manufacturing photoluminescent apparatus 100 is now described. As shown in FIG. 19, for example, method 200 may comprise: (i) preparing a glow medium with a target concentration of a photoluminescent material hosted in a base material (a preparing step 210); (ii) allowing the glow medium to set over a period of time (a setting step 220); (iii) forming the glow medium into a general shape, such as one approximate to body 106 of FIG. 1 (a forming step 230); (iv) trimming the general shape into a particular shape, such as that of body 106 of FIG. 1 (a trimming step 240); and (v) activating the photoluminescent material hosted in the base material (an activating step 250).

Preparing step 210 may comprise mixing an amount of the photoluminescent material together with an amount of the base material until the glow medium has a target concentration of the photoluminescent material. Any known mixing techniques and/or technologies may be utilized in step 210. For example, preparing step 210 may result in a glow medium having a total mass that is approximately 25% to approximately 50% photoluminescent material and approximately 70% to approximately 50% base material. At step 210, the photoluminescent material may be a powder that is mixable with the base material until the glow medium comprises a viscous liquid or formable paste that can be acted on in steps 220 and 230 to produce and to retain a desired shape for body 106. As a further example, preparing step 210 also may comprise additional steps for adding materials into the glow medium, such as adding a colorant and/or reflective material to the glow medium, either of which may be mixed into the glow medium during step 210.

Setting step 220 may comprise causing the glow medium to acquire an initial shape that can be further manipulated in forming step 230. For example, setting step 220 may comprise pouring the glow medium into a pan and leaving it there, exposed to ambient conditions, until it cures or "sets up" into a sheet of glow medium. As a further example, setting step 220 also may comprise pouring the glow medium into a mold or form and similarly leaving it there exposed to ambient conditions, until it cures or sets up into a shape corresponding to the mold or form. As a further example, setting step 220 also may comprise additional steps for adding materials into the glow medium, such as a colorant and/or reflective material, either of which may be brushed onto the sheet of glow medium during step 220.

Forming step 230 may comprise passing the sheet of glow medium through an extruder operable to form a general shape of body 106 by pushing a portion of the sheet through a die, resulting in a strip of the glow medium. Any known extrusion techniques and/or technologies may be utilized in step 230 to make the general shape of body 106. Forming step 230 may further comprise cutting the strip of glow medium to a desired length, such as the wand length shown in FIG. 1. Aspects of step 230 may be modified to produce a body 106 of any diameter and/or length. For example, step 230 also may comprise pulling the strip of glow medium through one or more additional tubes operable to further shape the strip. If a mold or form is utilized in setting step 220, then forming step 230 may alternatively comprise removing the mold or form to expose the resulting shape.

Trimming step 240 may comprise removing portions of body 106. As shown in FIG. 1, for example, trimming step 240 may comprise removing (e.g., cutting away) end portions from the strip of the glow medium produced in step 230 to realize the semispherical shape of ends 102 and 104 depicted in FIG. 1. Any known removal techniques and/or technologies may be utilized in step 240 to trim the general shape of body 106 from step 230. If a mold or form is utilized in setting step 220, then trimming step 240 may alternatively comprise removing smaller portions of the general shape, such as those caused by imperfections in the mold or form.

Aspects of forming step 230 and/or trimming step 240 may be modified to accommodate different percentages of the photoluminescent material in the glow medium. For example, if the percentage of photoluminescent material is approximately 50%, then the glow medium may be difficult to extrude with traditional methods, requiring step 230 to be modified or even omitted and/or trimming step 240 to be expanded to include additional shaping steps. As a further example, at higher percentages of the photoluminescent material, such as greater than approximately 50%, forming step 230 and/or trimming step 240 may comprise additional steps for casting the base material and the photoluminescent material in a mold, sculpting the glow medium into a desired shape, and/or dipping the base material into the photoluminescent material.

Activating step 250 may comprise exposing body 106 to light from an external source for a minimum charging time. Any type of light may be utilized, including light in the UV spectrum, such as sunlight. The minimum period of exposure time may be relevant to the chemical structure of the photoluminescent material. Any type of light may be utilized in activating step 250 to charge body 106. As shown in FIG. 19, for example, activating step 250 may comprise exposing body 106 to a light in the UV spectrum, such as sunlight or a UV-lamp, for a minimum charging time equal to approximately one (1) to three (3) hours. In this example, the light may activate the photoluminescent material hosted in the base material.

During step 250, portions of the photoluminescent material (e.g., the rare-earth nanocrystals approximate to exterior surfaces of body 106) may absorb photon energy from the light as excited electron orbital states and hold the absorbed energy in metastable states, allowing body 106 to store the photon energy and reemit it over time. By way of example, in a strontium illuminate based photoluminescent material, the metastable states may be achieved by doping of the strontium aluminate crystal structure with europium and dysprosium. These metastable states may enable the forbidden transition, where the excited electron orbital releases the energy of excitation via emission of a photon of light at a specific wavelength. Depending on the chemical structure of the photoluminescent material, these forbidden transitions may occur for twelve or more (12+) hours until body 106 requires recharging.

Activating step 250 may be repeated as need to recharge the photoluminescent material contained in body 106. Photoluminescent apparatus 100 may be recharged at any time, such as by intermittently placing apparatus 100 in UV-LED charging booth; and/or continuously charged, such as by leaving apparatus 100 outside in the sun. It is not necessary for photoluminescent apparatus 100 to emit all stored energy before recharging. Once charged (or re-charged) during step 250, photoluminescent apparatus 100 may be utilized for its intended purpose, meaning that it can be held, worn, and/or otherwise utilized in a manner consistent with traditional chemiluminescent glow sticks.

Additional aspects of this disclosure are now described with reference to a photoluminescent apparatus 300 shown in FIG. 300; a photoluminescent apparatus 400 shown in FIG. 4; a photoluminescent apparatus 500 shown in FIGS. 5, 6, 7, 8, 9, and 10; a photoluminescent apparatus 600 shown in FIG. 11; a photoluminescent apparatus 700 shown in FIGS. 12, 13, and 14; a plurality of photoluminescent apparatus 800 shown in FIG. 15; and a photoluminescent apparatus 900 shown in FIGS. 16 to 18. Aspects of photoluminescent apparatus 300, 400, 500, 600, 700, 800, and/or 900 may be like aspects of photoluminescent apparatus 100, but within their respective series of numbers. Aspects of photoluminescent apparatus 100 may be interchangeably combined with any aspects of any other photoluminescent apparatus 300, 400, 500, 600, 700, 800, and/or 900, and any obvious variations thereof, each combination and/or iteration being part of this disclosure.

Figure 3:
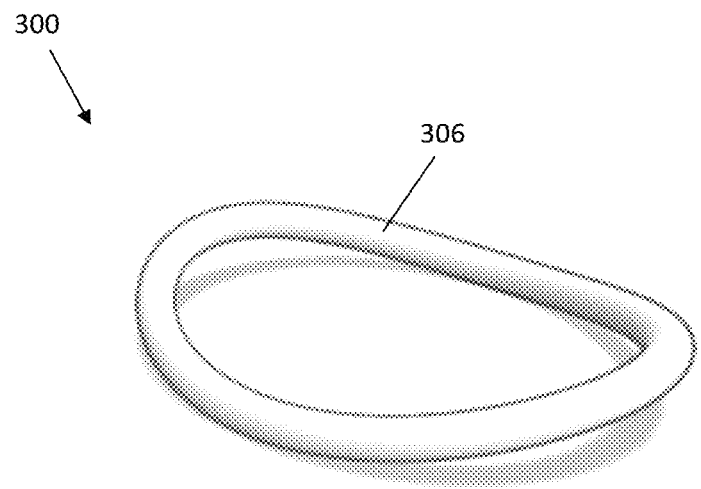
FIG. 3 depicts an exemplary photoluminescent apparatus having a circular shape.

As shown in FIG. 3, for example, photoluminescent apparatus 300 may be like photoluminescent apparatus 100, but with a body 306 having a continuous circular shape. Body 306 may be wearable as a wrist band, head band, hair tie, and the like. Aspects of body 306 may be modified to increase or decrease its flexibility as required for a particular wearable embodiment. For example, body 306 may be formed from a base material having a Durometer value of Shore 00 30 and/or A 30 so that it is flexible enough to fit over the hand and yet resilient enough to conform to the wrist. Body 306 may have any cross-sectional shape, including the circular cross section shown in FIG. 3, a rectangular cross section (e.g., like FIG. 4), and/or any other shape that is extrudable in forming step 230 described above. As a further example, body 306 may have a rectangular cross section like that of a Livestrong® bracelet. Body 306 may comprise a printable surface and/or a microchip. As shown in FIG. 3, a portion of body may comprise a generally rectangular cross section (e.g., like FIG. 4) and the printable surface may be defined by a planar portion of the generally rectangular cross section. The microchip may comprise an RFID chip and/or be contained in the body.

Aspects of method 200 may be modified to accommodate the circular shape of body 306 and/or its cross-sectional shape. As shown in FIG. 19, for example, setting step 220 may alternatively comprise pouring the glow medium of photoluminescent apparatus 300 into a circular mold or form until it cures or sets up into the circular shape. As a further example, the circular mold may comprise circular or rectangular cross-sectional shape configured to provide body 306 with the same.

Figure 4:
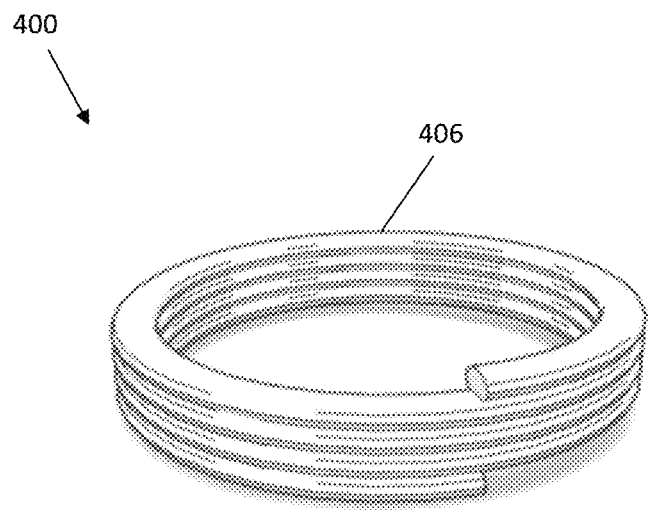
FIG. 4 depicts an exemplary photoluminescent apparatus having a coil shape.

As shown in FIG. 4, for example, photoluminescent apparatus 400 may be like photoluminescent apparatus 100, but with a body 406 having a coil shape. Body 406 may be wearable like body 306. Alternatively, because of its coil shape, body 406 also may be utilized to join two other objects together, like a key ring; and/or provide a dampening force therebetween, like a metal spring. Aspects of body 406 may be modified to increase or decrease its flexibility as required for its intended use. As shown in FIG. 4, for example, body 406 may be formed from a base material having a Durometer value of Shore D 50 or A 70 so that it is rigid enough to operate in a spring-like manner. Aspects of method 200 may be similarly modified to accommodate the coil shape of body 406. For example, as described above, forming step 230 may comprise passing a sheet of glow medium through an extruder operable to form body 406 into the coil shape depicted in FIG. 4 as having a generally rectangular cross section.

Figure 5:
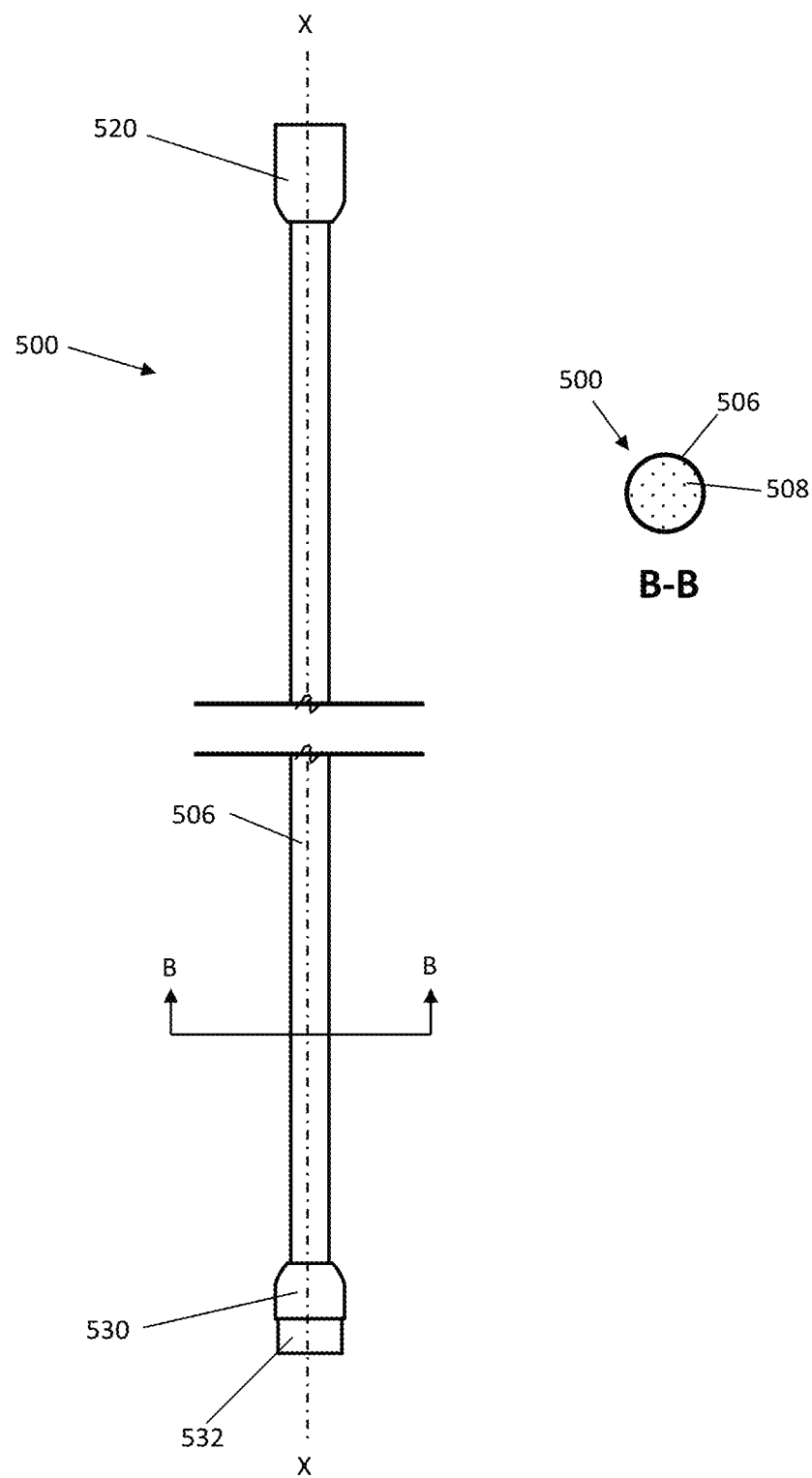
FIG. 5 depicts a side view of an exemplary photoluminescent apparatus with removably attachable ends; and indicates a section line B-B extending therethrough.

As shown in FIG. 5, for example, photoluminescent apparatus 500 may comprise a body 506 having an elongated shape like that of body 106. Body 506 may be solid as shown in FIG. 5, or be hollow like body 706, shown in FIG. 12 as comprising a channel or lumen 740 extending longitudinally therethrough, or body 906, shown in FIG. 16 as comprising a similar channel or lumen 940 extending longitudinally therethrough. Similar to as described below, the channel of body 506 (e.g., similar to as shown in FIGS. 12 and/or 16, if provided) may extend through body 506 to reduce the cost and/or weight of body 506, increase the flexibility of body 506, and/or allow light to access interior portions of body 506.

Figure 6:
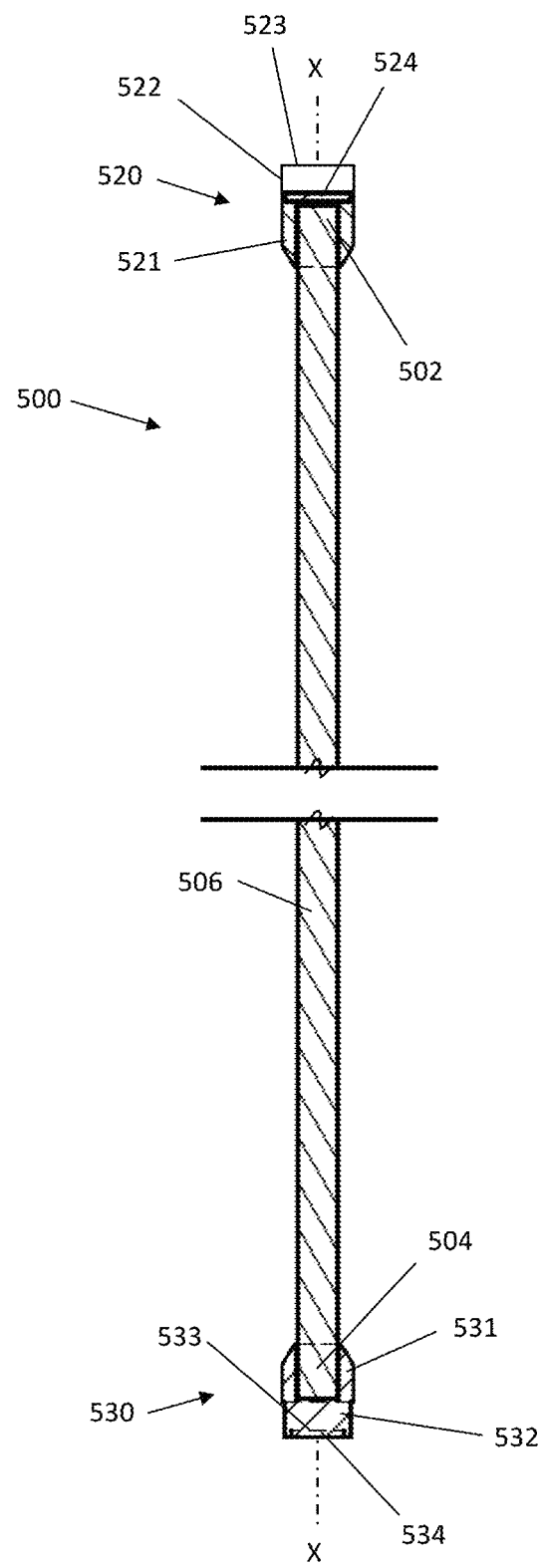
FIG. 6 depicts a cross-sectional view of the FIG. 5 apparatus.
Figure 7:
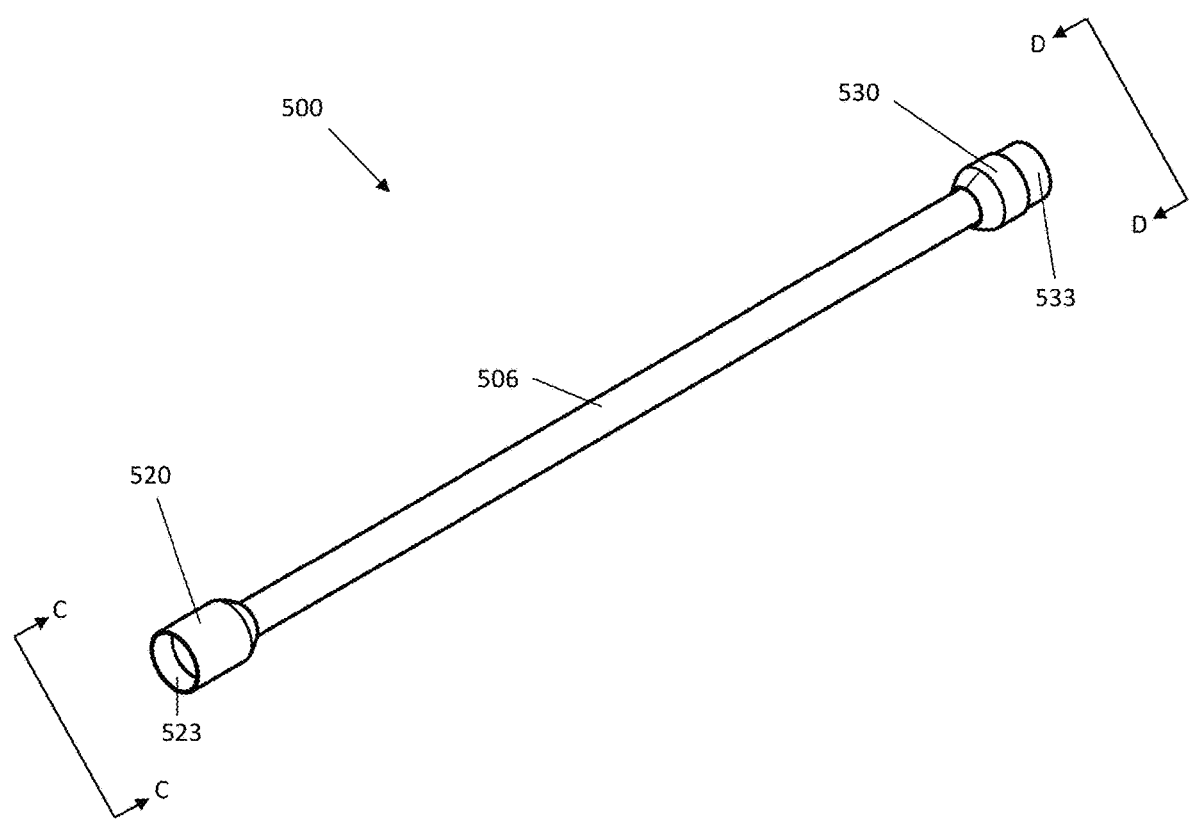
FIG. 7 depicts a perspective view of the FIG. 5 apparatus; and indicates a view C-C facing one end of the apparatus and a view D-D facing the other end of the apparatus.

Photoluminescent apparatus 500 also may comprise a first connector 520 at a first end 502 of body 506 and a second connector 530 at a second end 504 of body 506. As shown in section B-B of FIG. 5, body 506 (like body 106) may comprise a central portion with a solid cross section having a circular diameter that extends along the length of body 506 to define its elongated cylindrical shape. Any type of cross section may be utilized, including a square shape, a rectangular shape, and/or any other open or closed geometric shape, including those similar to a wrist band and/or watch band. Body 506 may similarly be of any length. As shown in FIGS. 5, 6, and 7, for example, the length of body 506 may be equal to that of a bracelet having a length of between approximately 5 and 7 inches, or that of a necklace having a length of between approximately 14 and 33 inches. If provided, the channel or lumen of body 506 may extend generally through the solid cross section of body 506 as shown in section B-B of FIG. 5 (e.g., like section G-G of FIG. 16).

First connector 520 may be removably attachable to second connector 530 for the purpose of converting the elongated cylindrical shape of body 506 into a continuous circular shape like that of body 306. Any type of removable attachment may be utilized without departing from this disclosure, including Velcro®, traditional watch clasps, and/or holes and pins like those currently utilized on the strap of an Apple® watch. As shown in FIG. 6, for example, first connector 520 may comprise a body attachment 521, a female attachment 522, an end opening 523, and a first magnetic element 524. Body attachment 521 may comprise a cylindrical structure sized to receive first end 502 of body 506. A portion of body attachment 521 may be crimped and/or screwed onto first end 502. Female attachment 522 may comprise a cylindrical structure sized to receive a corresponding portion second connector 530. End opening 523 may be located at an end of female attachment 522.

Figure 8:
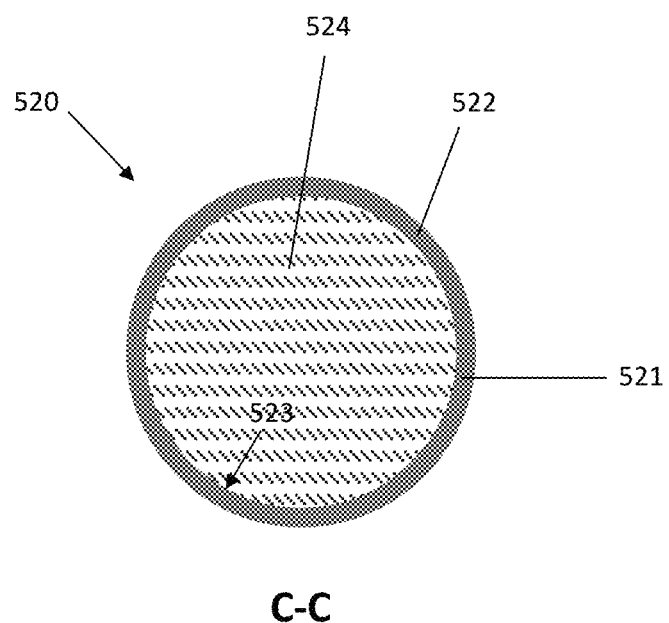
FIG. 8 depicts an end view of the FIG. 5 apparatus along view C-C.

As shown in FIG. 6, for example, first magnetic element 524 may comprise a disc shaped magnet secured in body attachment 521. An interior diameter of the cylindrical structure of body attachment 521 may be less than an interior diameter of the cylindrical structure of female attachment 522 and approximately equal to the diameter of first magnetic element 524. As shown in FIG. 8, for example, first magnetic element 524 may be located between end 502 of body 506 and an interior ledge of female attachment 522 so that a face of magnetic element 524 is visible from view C-C of FIG. 5. In this configuration, because of the interior ledge, first magnetic element 524 cannot be pulled out of end opening 523. First magnetic element 524 may comprise any type of magnet and/or ferromagnetic material, including any type of rare-earth magnet.

As also shown in FIG. 6, for example, second connector 530 may comprise a body attachment 531, a male attachment 532, an end recess 533, and a second magnetic element 534. Body attachment 531 may comprise a cylindrical structure sized to receive second end 504 of body 506. A portion of body attachment 531 may be crimped and/or screwed onto second end 504. Male attachment 532 may comprise a cylindrical extension sized for receipt inside of the cylindrical structure of female attachment 522. As shown in FIG. 6, for example, the cylindrical extension of male connector structure 532 may extend outwardly from body attachment 531. End recess 533 may be located on an end face of male attachment 522.

Figure 9:
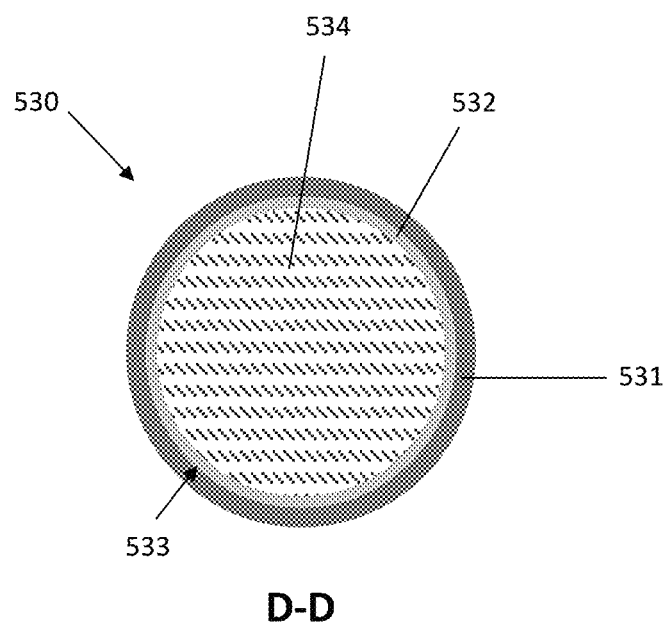
FIG. 9 depicts an end view of the FIG. 5 apparatus along view C-C.

As shown in FIG. 6, for example, second magnetic element 534 may comprise a disc shaped magnet secured in end recess 533. Edges and/or an inward face of second magnetic element 534 may be adhered, screwed into, or otherwise attached to interior surfaces of recess 533. As shown in FIG. 9, for example, second magnetic element 534 may be secured in recess 533 so that a face of magnetic element 534 is visible from view D-D of FIG. 5. In this configuration, because it is secured therein, second magnetic element 534 cannot be pulled out of recess 533. Second magnetic element 534 also may comprise any type of magnet and/or ferromagnetic material, including any type of rare-earth magnet.

Figure 10:
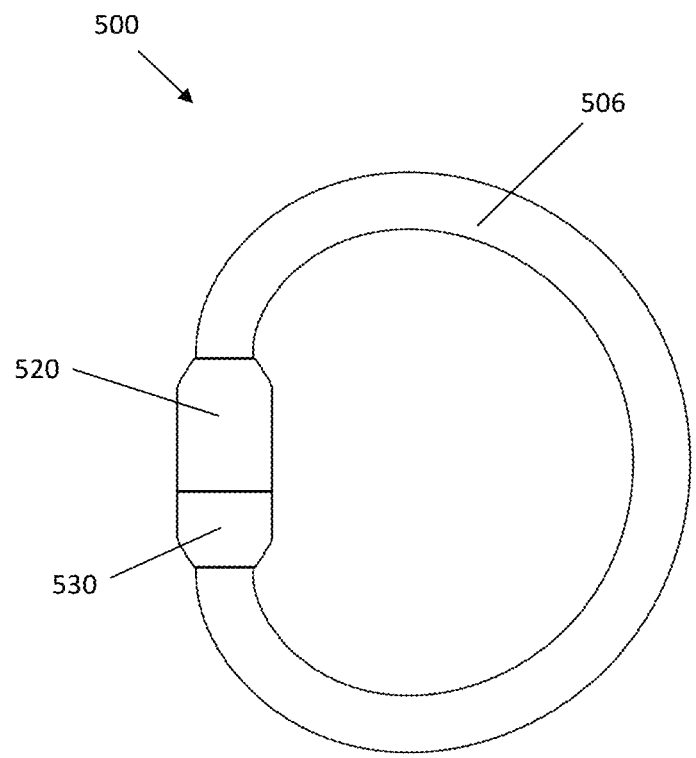
FIG. 10 depicts a bracelet example of the FIG. 5 apparatus, in which the end of FIG. 8 is removably attached to the end of FIG. 9.

As shown in FIGS. 6, 7, 8, and 9, for example, an outer diameter of female attachment 532 may be smaller than an inner diameter of male attachment 522 so that the cylindrical extension of attachment 532 may be slid into the cylindrical structure of attachment 522 until the face of first magnetic element 524 is positioned opposite the face of second magnet element 534. At this point, a magnetic interaction between elements 524 and 534 may be utilized to pull male attachment 522 into female attachment 532 until first magnetic element 524 is opposite second magnetic element 534. As shown in FIG. 10, for example, first and second connectors 520 and 530 may thus be operable to convert the elongated shape of body 506 depicted in FIG. 5 to the circular shape of body 506 depicted in FIG. 10.

Put another way, first and second connectors 520 and 530 may be operable as a magnetic clasp for photoluminescent apparatus 500, allowing it to be worn as a bracelet and/or necklace that is easily removable from the wearer. Any type of releasably connectable clasp structure may be utilized, including non-magnetic variations like those described herein. Aspects of body 506 may be modified to increase or decrease its flexibility as required. For example, body 506 may be formed with a higher concentration of the photoluminescent material (e.g., approximately 43%) and/or from a base material having a higher Durometer value because, unlike body 306, it does not have to expand when being fit over the hand or head. First and second connectors 520 and 530 also may be aesthetically pleasing. As shown in FIGS. 5, 6, 7, 8, 9 and 10, for example, connectors 520 and 530 may be metallic and/or polymeric elements having a polished finish.

Different shapes of body 506, connector 520, and/or connector 530 may be utilized without departing from this disclosure. Although shown as being circular, for example, the cross section of body 506 also may comprise a square, an N-sided polygon, and/or any other open- or closed-ended shapes. A portion of body 506 may be pressed after extrusion to create a gradual flattening of body 506 near its central portion that tapers towards ends 502, 504. The shapes of ends 502, 504 and/or connectors 520, 530 also may comprise different attachment structures that are attachable to other devices, such as another type and/or form of clasp.

Figure 11:
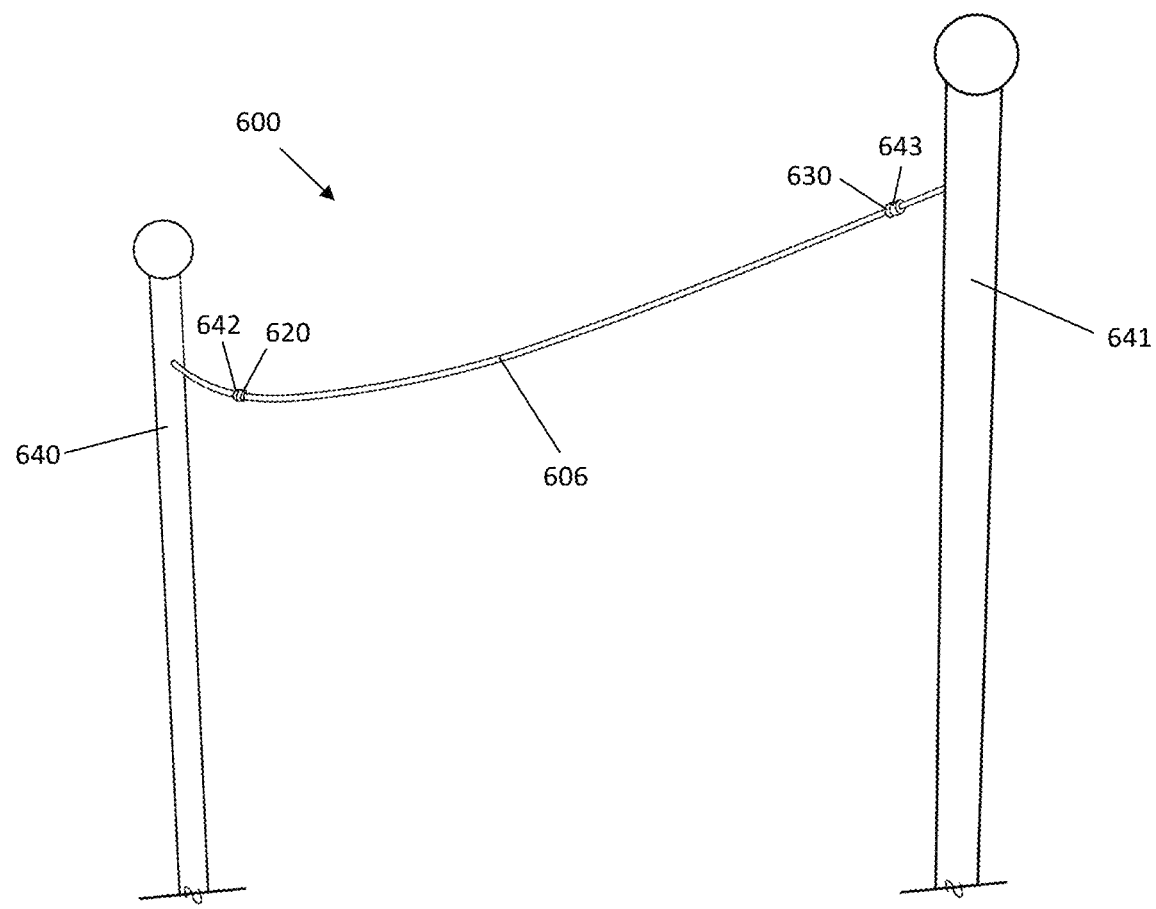
FIG. 11 depicts a rope example of the FIG. 5 apparatus, in which the end of FIG. 8 is removably attached to a first support (e.g., shown as a first post) and the end of FIG. 9 is removably attached to a second support (e.g., shown as a second post).

As shown in FIG. 11, for example, photoluminescent apparatus 600 may be like photoluminescent apparatus 500, but with a much longer body 606, allowing it to serve as cord, rope, or barrier extending between a first support 640 (e.g., shown as a first post) and a second support 641 (e.g., shown as a second post). First and second connectors 620 and 630 may be similar or even identical to first and second connectors 520, 530 and thus similarly utilized to removably attach body 606 to supports 640 and 641. As shown in FIG. 11, for example, first support 640 may comprise a first support attachment 642 comprising a female connector 620 like connector 520, second support 641 may comprise a second support attachment 643 comprising a male connector 630 like connector 530, and body 606 may be suspended between supports 640 and 641 by attaching connector 620 to connector 642 and connector 630 to connector 643 as described above. Depending on the length of body 606, connectors 620, 630 and attachments 641, 643 may utilize a magnetic connection like connectors 520 and 530 and/or a threaded connection for added strength. Body 606 also may comprise a structural support cord (e.g., made of nylon) that is integrated (e.g., woven) into a bundle of cords to form a rope with glowing elements and load bearing elements.

Figure 12:
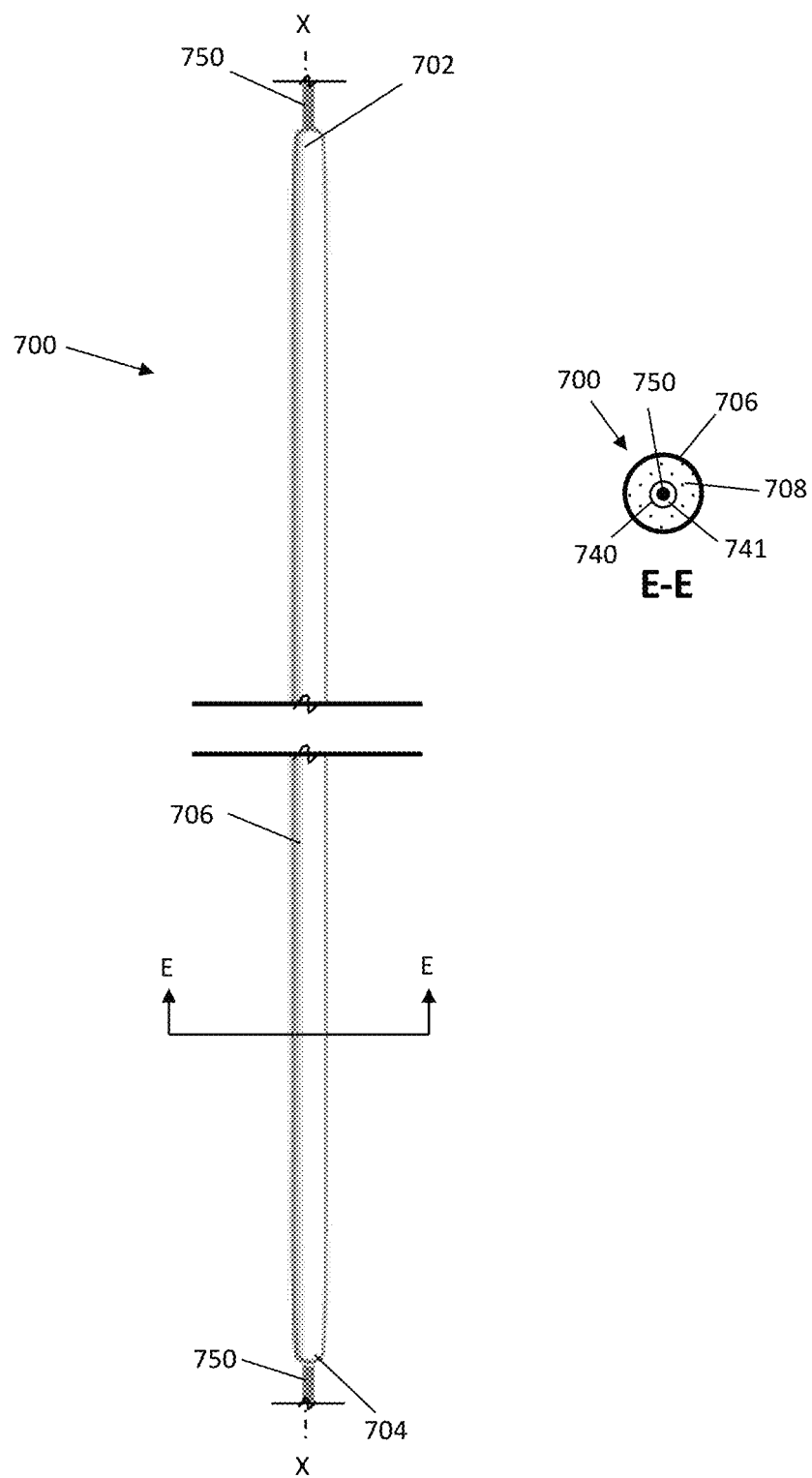
FIG. 12 depicts a side view of an exemplary photoluminescent apparatus having a channel extending therethrough and an optional element in the channel; and indicates a section line E-E extending therethrough.
Figure 13:
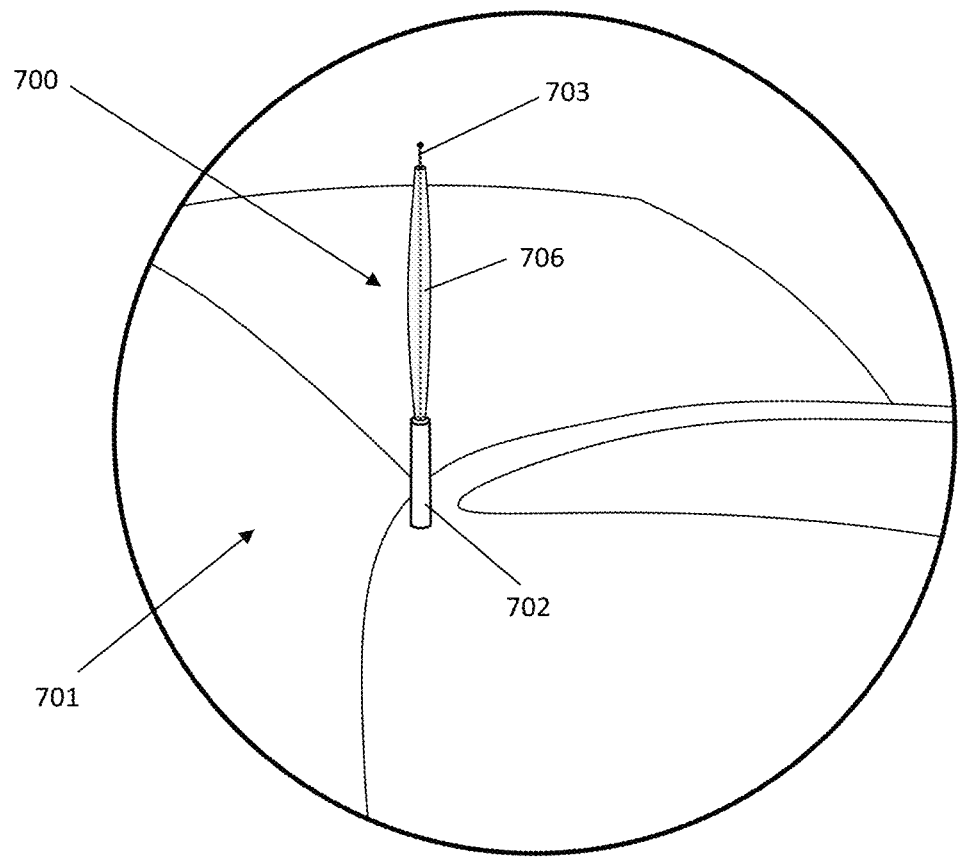
FIG. 13 depicts a cover example of the FIG. 12 apparatus, in which the channel has been slipped over a support element (e.g., shown as an antenna).

As shown in FIG. 12, for example, photoluminescent apparatus 700, much like photoluminescent apparatus 100, may comprise a first end 702, a second end 704, and a body 706 extending between ends 702 and 704 along a longitudinal axis X-X.

In contrast to photoluminescent apparatus 100 of FIG. 1, photoluminescent apparatus 700 of FIG. 12 also may comprise a channel or lumen 740 extending therethrough along longitudinal axis X-X. Aspects of method 200 may be modified to accommodate channel 740. For example, forming step 220 may comprise passing a sheet of glow medium through an extruder operable to form a general shape of body 706 and channel 740 by pushing a portion of the sheet through an annular die. As shown in section E-E of FIG. 12, for example, channel 740 may be utilized to reduce the cost and/or weight of body 706, increase the flexibility of body 706, and/or allow light to access interior portions of body 706 through interior surfaces 741 of channel 740 for faster recharging, making it useful with or without support element 750.

As shown in FIG. 12, for example, channel 740 may be sized to receive a support element 750, such as a cable or wire. As shown in section E-E of FIG. 12, for example, interior surfaces 741 of channel 740 may have an inner diameter that is greater than an outer diameter of support element 750 so that photoluminescent apparatus 700 may be moved relative to element 750. Interior surfaces 741 may comprise a lubricant (e.g., like Teflon®) operable to facilitate these movements and prevent body 706 from being damaged during normal use. Channel 740 may be sized to host different types of support elements 750. Support element 750 may comprise a rigid element, such as a wire. As shown in FIG. 13, for example, support element 750 may comprise a car antenna attached to a car, allowing apparatus 700 to be attached to the car by sliding channel 740 over the antenna (i.e., support element 750 in this instance). Accordingly, if the car is stored outside during the day, then photoluminescent apparatus 700 may serve as an additional safety element that will glow in the dark even if the car's headlights go out.

Figure 14:
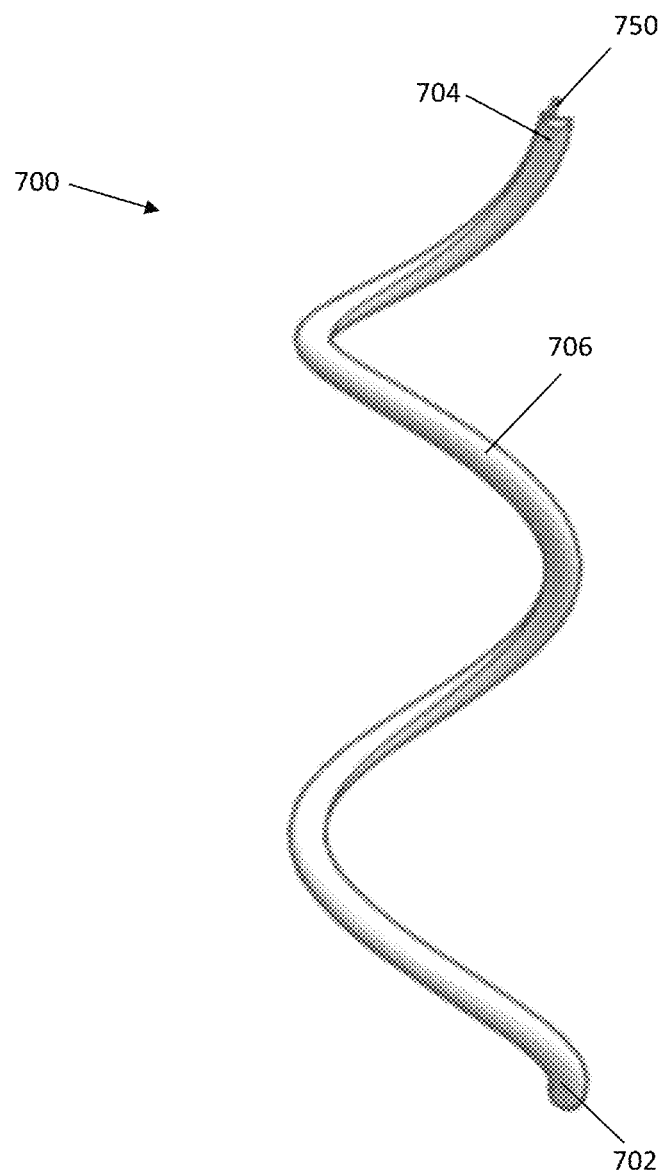
FIG. 14 depicts a decorative example of the FIG. 12 apparatus, in which the channel has been slipped over a wire structure.

As shown in FIG. 14, for example, support element 750 may comprise a shape memory wire (e.g., made of nitinol) operable to retain a predetermined shape (e.g., such as a coil shape) even if deformed. In this example, body 706 may be modified for flexibility and channel 740 may be slid over the shape memory wire (i.e., support element 750 in this instance) so that a shape of photoluminescent apparatus 700 is determined by the predetermined shape of the shape memory wire. As shown in FIG. 14, for example, support element 750 may be friction fit inside of channel 750 and/or attached to interior surfaces 741 using an adhesive, ensuring that element 750 stays within photoluminescent apparatus 700. Support element 750 may extend through channel 740 along longitudinal axis X-X. As shown in FIG. 14, for example, a first end of support element 750 may be embedded in first end 702 of body 706 and a second end of element 750 may extend outwardly from second end 704 for attachment to another structure (e.g., like a faux flower).

Support element 750, much like body 706, may have any length. As described herein, support element 750 may comprise any type of material that is rigid enough to maintain a shape of photoluminescent apparatus 700 and yet flexible enough to be resiliently molded around a variety of objects. Photoluminescent apparatus 700 may be sold separately from support element 750, as shown in FIG. 13; or sold together with element 750 as part of a system, like that shown in FIG. 14.

A plurality of photoluminescent apparatus 800 may be shaped and mounted to create photoluminescent signage that may be utilized to replace traditional forms of signage, such as neon lights, with environmentally friendly alternatives that do not utilize electricity. As shown in FIG. 15, for example, plurality of photoluminescent apparatus 800 may comprise different symbolic shapes (e.g., Japanese symbols such as Hiragana) and/or individual letter shapes, including the English letter shapes 801, 811, 812, 813, and 814 of FIG. 15 and/or any other similarly shaped alphanumeric symbols of any language. As shown in FIG. 15, for example, each shape 801, 811, 812, 813, and 814 may comprise a body 806 extending along longitudinal axis X-X. In the depicted example, bodies 806 of shapes 801, 811, 812, 813, and 814 may be operable with one or more support elements 850 spell out a desired word, such as the term "A SIGN" in an exemplary font.

Different cross sections of body 806 may be utilized to realize different optical effects for plurality of photoluminescent apparatus 800, such as broader and thicker symbolic depictions that are viewable from a wider field of vision than traditional LCD signs and existing plate-shaped glowing signs (e.g., "EXIT" signs). As shown in section F-F of FIG. 15, for example, each shape 801, 811, 812, 813, and 814 may have a circular exterior diameter 807 defined by an annular ring of glow medium 808 surrounding a support element 850 with a circular cross section made of a metallic material (e.g., stainless steel) having material characteristics amenable to: (i) bending each body 806 into the depicted letter-shape; (ii) maintaining a form of the shape against normal operating forces (e.g., wind and/or snow loads); and/or (iii) facilitating attachment of the shape to a supporting structure (e.g., a wall). Interior surfaces of annular ring of glow medium 808 may be generally adhered to exterior surfaces of support element 850 along the length of each body 806 to limit deformations of circular exterior diameter 807.

Each body 806 also may be formed with a concentration of photoluminescent material (e.g., approximately 50%) and/or a base material having a Durometer value (e.g., of less than Shore D 50) optimized to permit flexible reformation into a different shape, making it reusable under certain conditions. As shown in FIG. 15, for example, plurality of photoluminescent apparatus 800 may be mounted on a wall that itself may be colored (e.g., flat black) to maximize the visibility of light output from apparatus 800. A further example is a kit comprising plurality of photoluminescent apparatus 800, mounts for each body 806 of apparatus 800, an amount of background paint, and/or instructions for shaping plurality of photoluminescent apparatus 800 into particular shapes and/or mounting bodies 806 to depict different symbols or spell different terms with the letter shapes. In this respect, it is contemplated that the dimensions and/or flexibilities of each body 806 in each kit may vary to accommodate different complexities of different symbolic items, such as different types of letters in English and/or symbolic forms in other languages, such as between Hiragana and Katakana characters in Japanese.

Steps of method 200 may be modified to accommodate plurality of photoluminescent apparatus 800. As shown in FIG. 19, for example, various steps of method 200 may comprise: (i) bending each body 806 made with trimming step 240 into one of the letter shapes depicted in FIG. 15; and (ii) performing activating step 250 therewith to arrive at the glowing letters depicted in FIG. 15. As a further example, method 200 also may comprise: (i) bending each support element 850 of each body 806 into a predetermined symbolic shape; (ii) dipping generally all of each of predetermined symbolic shape into a correspondingly shaped mold containing the glow medium prepared in step 210; (iii) allowing the glow medium to set in the mold over a period of time; and/or (iv) performing trimming step 240 and activating step 250 therewith to arrive at the glowing letters depicted in FIG. 15. In another example, method 200 may comprise: (i) applying a layer of the glow medium onto the predetermined symbolic shapes; (ii) allowing the layer of glow medium to set on the shape; and (iii) applying additional layers of the glow medium as needed to obtain minimum dimensions for diameter 807 and/or annular ring 808.

Figure 16:
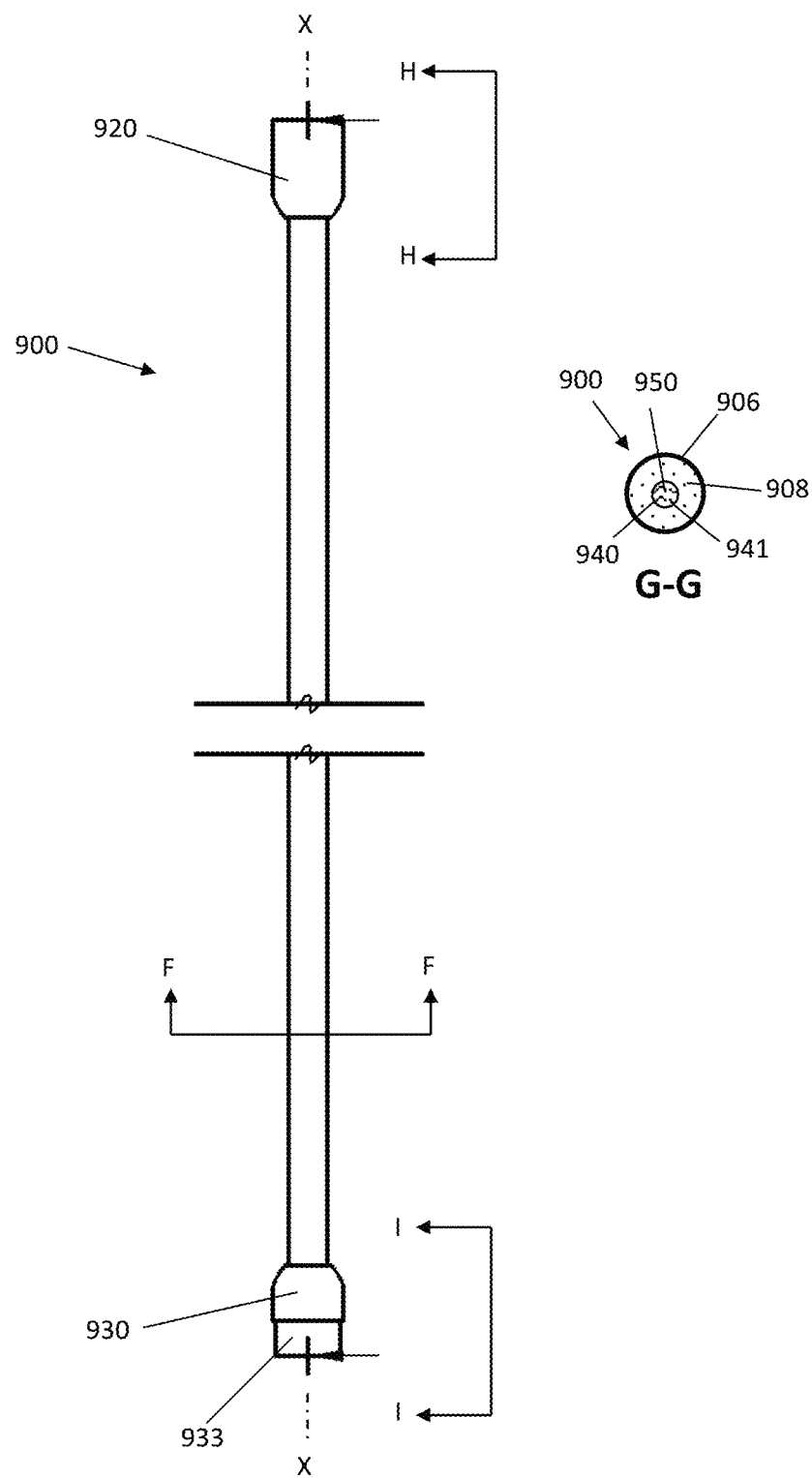
FIG. 16 depicts a side view of an exemplary photoluminescent apparatus with removably attachable ends, a channel extending through the elongated shape, and an optical fiber in the channel; and indicates a section line G-G extending through the elongated shape, the channel, and the optical fiber, a section line H-H extending through one end of the apparatus, and a section view I-I extending through the other end of the apparatus.
Figure 17:
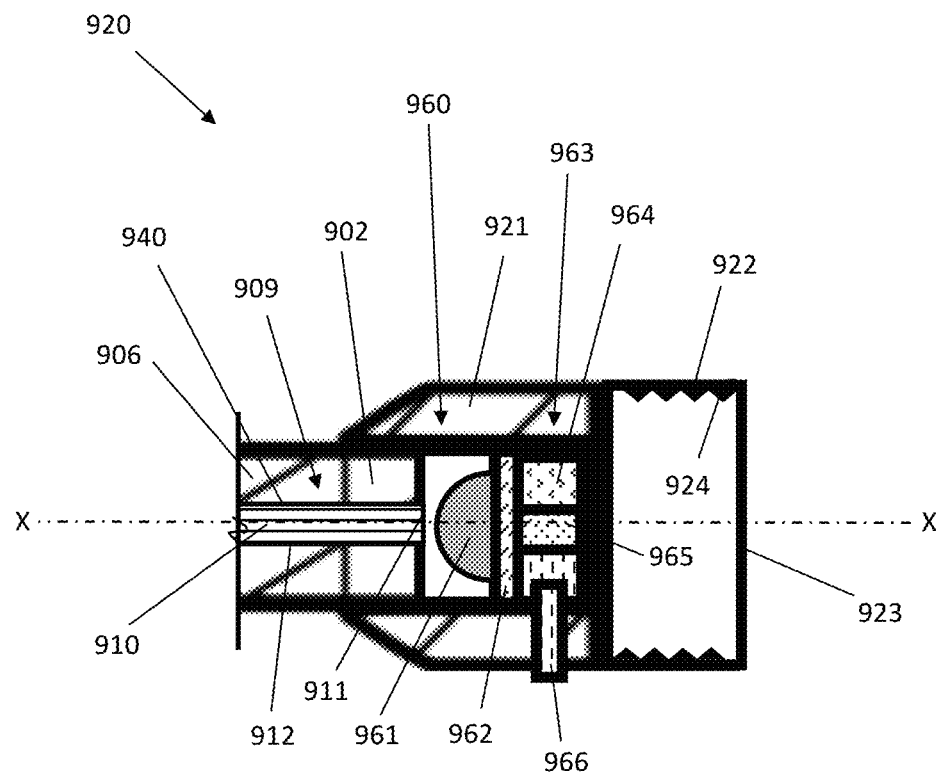
FIG. 17 depicts a cross-sectional view of the end at section line H-H.
Figure 18:
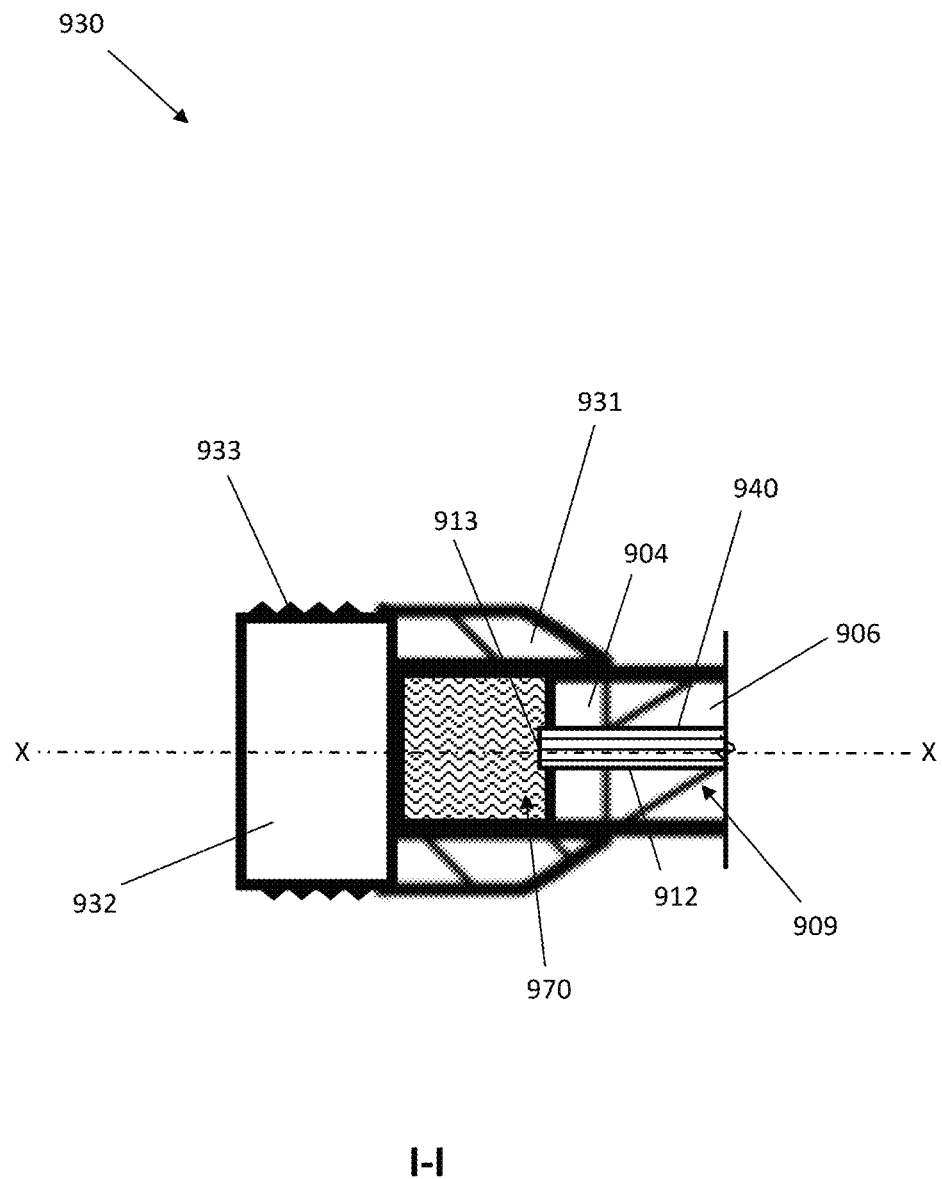
FIG. 18 depicts a cross-sectional view of the end at section line I-I.

As shown in FIGS. 16, 17, and 18, for example, photoluminescent apparatus 900 may comprise a body 906, a first connector 920 at a first end 902 of body 906, and a second connector 930 at a second end 904 of body 906. As shown in section G-G of FIG. 16, for example, body 906 may comprise annular ring of glow medium 908 defining a channel or lumen 940 that is similar to channel or lumen 740 of body 706 described above and shown in FIG. 12. As shown in FIG. 16, for example, channel 940 may extend through body 906 to reduce the cost and/or weight of body 906, increase the flexibility of body 906, and/or allow light to access interior portions of body 906. Photoluminescent apparatus 900 may be manufactured and sold as shown in FIG. 16 without placing any additional elements in channel 940. Alternatively, as further shown in FIG. 16, channel 740 may contain an optical fiber 909 configured to direct an amount of light toward interior portions of body 906. As shown in FIGS. 17 and 18, for example, one or both of connectors 920 and 930 may be selectively operable to transmit the light to optical fiber 909 for distribution therewith to interior surfaces of body 906 along its length, allowing photoluminescent apparatus 900 to be charged from within using optical fiber 909.

As shown in FIG. 17, for example, first connector 920 may comprise a body attachment 921, a female attachment 922, and an LED assembly 960. In keeping with above, body attachment 921 may comprise a cylindrical structure sized to receive first end 902 of body 906. As shown in FIG. 17, for example, interior surfaces of body attachment 921 may engage exterior surfaces of first end 902 to generally align a central axis of optical fiber 909 with a longitudinal axis X-X extending through first connector 920 and LED assembly 960 contained therein. A portion of body attachment 921 may be crimped or screwed onto first end 902, helping to maintain the alignment of fiber 909. Female attachment 922 may comprise a cylindrical structure sized to receive a corresponding portion of second connector 930. As shown in FIG. 17, for example, an end opening 923 may be located at an end of female attachment 922; and threads 924 may be located on interior surfaces of the cylindrical structure of female attachment 922.

As shown in FIG. 17, for example, optical fiber 909 may comprise a core 910 surrounded by a transparent cladding material 912 with an index of refraction that keeps at least a portion of the light output from LED assembly 960 in core 910 by the phenomenon of total internal reflection, allowing optical fiber 909 to act as a partial waveguide. As shown in section G-G of FIG. 16, for example, transparent cladding material 912 may be adhered to interior surfaces of channel 740 with a generally translucent adhesive. As shown in FIG. 17, for example, LED assembly 960 may comprise an LED 961, a printed circuit board or "PCB" 962, and processing elements 963. Interior surfaces of body attachment 921 may engage exterior surfaces of first end 902 of body 906 to generally align an end face 911 of core 910 of optical fiber 909 with longitudinal axis X-X. As also shown in FIG. 17, for example, interior surfaces of body attachment 921 also may engage exterior surfaces LED assembly 960 (e.g., PCB 962) to generally align LED 961 with longitudinal axis X-X and thus end face 911 of core 910. LED 961 may comprise: a UV LED operable to output a UV light and/or an RGB LED, meaning a red, blue, and green LED operable to produce over 16 million hues of light. PCB 962 may comprise a rigid support structure with a first face comprising circuitry and mounting structures for LED 961 and a second face comprising circuitry and mounting structures for processing elements 963.

As shown in FIG. 17, for example, processing elements 963 may comprise a heatsink 964, a power source 965, and a controller 966. Heatsink 964 may comprise a block of metallic material with fins operable to regulate an operating temperature of LED 961. Power source 965 may comprise a small battery element, such as a circular lithium battery. The elements of first connector 920 may be taken apart to replace power source 965 when depleted. Power source 965 also may comprise wired or wireless charging elements. As shown in FIG. 17, for example, power source 965 may comprise a power generating element, such as kinetic element operable to charge power source 965 when first connector 920 is moved; and/or a thermoelectric generator operable to charge power source 965 when gripped by a hand of user to produce a temperature differential between the air and skin of the user that creates enough voltage to charge power source 965. Controller 966 may be operable to direct electricity from the power source to LED 961 and modify the color and/or type of the light output therewith. As shown in FIG. 17, for example, controller 966 may comprise any type of mechanical and/or electrical switch, including the depicted spring-pin switch and/or a wireless means of communication (i.e., a Bluetooth transmitter).

As shown in FIG. 18, for example, second connector 930 may comprise a body attachment 931, a male attachment 932, and a reflector assembly 970. Much like body attachment 921, body attachment 931 may comprise a cylindrical structure sized to receive second end 904 of body 906. Interior surfaces of body attachment 931 may similarly engage exterior surfaces of second end 904 to generally align a central axis of optical fiber 909 with a longitudinal axis X-X extending through second connector 930 and reflector assembly 970 contained therein. A portion of body attachment 931 may be similarly crimped or screwed onto second end 904, helping to maintain the alignment of fiber 909. Male attachment 932 may comprise a cylindrical extension sized for receipt in the cylindrical structure of female connector 922. Threads 933 may be located on exterior surfaces of male attachment 933 and engageable with threads 923 of female attachment 923. As shown in FIG. 18, for example, reflector assembly 970 may comprise a light reflecting material and/or surface operable to reflect a portion of the light transmitted by core 910 back into optical fiber 909 through an end face 913 of core 910. The light reflecting material and/or surface may be attached to end face 913 and/or second end 904.

Controller 966 may be operable with power source 965 to cause LED 961 to output light into end face 911 of core 910. Cladding material 912 may cause: (1) a first portion of the light from LED 961 of assembly 960 to travel along the length of optical fiber 909 in core 910 by the phenomenon of total internal reflection; and (2) a second portion of the light from LED 961 to escape core 910 along the length of optical fiber 909. The first portion of the light from LED 961 may escape core 910 through end face 913 and be reflected back into core 910 with reflector assembly 970. The second portion of the light from LED 961 may be absorbed by interior surfaces of channel 940 of body 906, allowing the glow medium contained in body 906 to be charged along its length from within via optical fiber 909 and LED 961 of LED assembly 960. Reflector assembly 970 may comprise a reflective material and/or reflective surfaces operable to re-direct the first portion of light back into core 910 for eventual escape into body 906, helping to charge body 906 evenly and consistently from within, along its entire length.

In contrast to above, body 906 of photoluminescent apparatus 900 may thus be charged by an external light source, such as the sun; and/or by an internal light source, such as LED 961 of LED assembly 960. Because of this combination, photoluminescent apparatus 900 may have a persistent phosphorescence of greater intensity and/or longer duration, with less dimming, than other photoluminescent apparatus described herein. If continuously charged by LED assembly 960, then photoluminescent apparatus 900 may be utilized to replace many forms of exterior lighting and/or signage.

Aspects of photoluminescent apparatus 900 may be combined with any other aspects described herein. As shown in FIGS. 17 and 18, for example, aspects of LED assembly 960 and reflector assembly 970 may be embedded in ends 102 and 104 of body 106 of photoluminescent apparatus 100; mounted in-line within body 306 of photoluminescent apparatus 300; and/or mounted in channel 740 of photoluminescent apparatus 700, interior surfaces of which may be treated with a semi-reflective surface that operates similarly to cladding 912 of optical fiber 909. If photoluminescent apparatus 900 is embodied as a rope element, like photoluminescent apparatus 600 shown in FIG. 11, for example, then power source 965 may comprise a grid connection, allowing apparatus 900 to be deployed as an illuminated fencing and/or signage. In this example, second connector 930 may comprise a second LED assembly 960 if needed to distribute the light more evenly throughout a longer body 906.

As shown in FIGS. 1-18 and described above, for example, the glow medium defining the shape of body 106, 306, 406, 506, 606, 706, 806, and/or 906 may permit targeted wavelengths of light to charge the photoluminescent material hosted therein. The chemical structure of the glow medium may comprise any type of additives and/or additions operable to affect the flexibility of body 106, 306, 406, 506, 606, 706, 806, and/or 906 by increasing or decreasing a Durometer value of the base material. As described herein, for example, the base material may comprise any type of medical grade silicones and/or silicone composites, many of which are desirable for being non-reactive, skin-safe, biologically inert, non-plastic, and recyclable.

Figure 15:
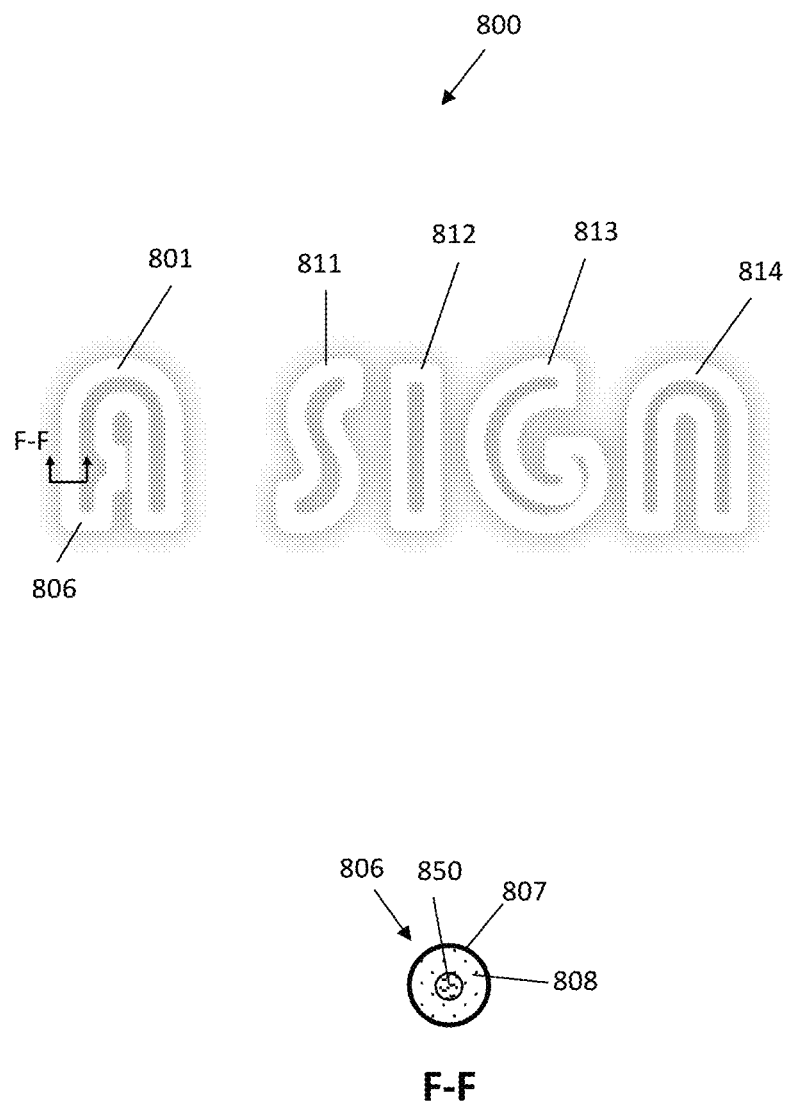
FIG. 15 depicts a signage example, in which a plurality of photoluminescent apparatus (e.g., like those shown in FIG. 12) have been arranged and shaped to form the words "A SIGN"; and indicates a section line F-F extending therethrough.

Different lengths of body 106, 306, 406, 506, 606, 706, 806, and/or 906 may be utilized, allowing photoluminescent apparatus 100, 300, 400, 500, 600, 700, 800, and/or 900 to be held (as in FIGS. 1 and 2), worn around the wrist or neck (e.g., as in FIGS. 3-10 and 16-18), utilized as a fence or rope (e.g., as in FIG. 11), mounted on other support structures (e.g., as in FIGS. 13 and 14), and/or mounted to a support structure as a form of signage (e.g., as in FIG. 15). Any of photoluminescent apparatus 100, 300, 400, 500, 600, 700, 800, and/or 900 may be elongated and/or interconnected with another photoluminescent apparatus 100, 300, 400, 500, 600, 700, 800, and/or 900 to achieve a particular length for a particular use.

Although shown as continuous and/or self-attaching shapes, it is also contemplated that photoluminescent apparatus 100, 300, 400, 500, 600, 700, 800, and/or 900 may comprise of two-piece designs, like those of an Apple watch band; and multi-piece designs, like those of a necklace or rope having different glowing portions with different glowing characteristics.

Aspects of body 106, 306, 406, 506, 606, 706, 806, or 906 of any photoluminescent apparatus 100, 300, 400, 500, 600, 700, 800, and 900 (e.g., such as exterior or interior surfaces thereof) may be treated to better resistant damage via water, pressure, stretching, twisting, bending, and temperature. As described above, for example, channel 740 of photoluminescent apparatus 700 may be lined with a protective coating that protects interior surfaces 741 from being damaged by support element 750 when inserted therethrough.

Similar to as shown in FIGS. 1 to 18, body 106, 306, 406, 506, 606, 706, 806, and/or 906 may comprise an additional fluorescent material(s) that alters the visible appearance of the photoluminescent apparatus 100. The additional fluorescent material(s) may comprise FWAs and/or chromatic colorants that are mixed into glow medium as part of preparing step 210 and/or applied to body 106, 306, 406, 506, 606, 706, 806, and/or 906, such as prior to activating step 250. The additional fluorescent material may amplify an amount of light emitted from the photoluminescent material, transform the emitted light to a different wavelength, and/or cause other changes to the visible appearance of body 106, 306, 406, 506, 606, 706, 806, and/or 906. For example, the additional fluorescent material may cause photoluminescent apparatus 100, 300, 400, 500, 600, 700, 800, and 900 to appear whiter, more reflective, brighter, longer lasting, more energy efficient, and/or to have one or more different colors.

As a further example, the additional fluorescent material(s) also may transform the wavelength of applied light to the UV range, helping to charge the photoluminescent material with light that is in the optimum excitation wavelength range. As shown in FIGS. 16 to 18, for example, the additional fluorescent material(s) may be applied to interior of body 906 and/or cladding material 912 of optical fiber 909 to convert the light output from LED assembly 960 into UV light. The additional fluorescent material(s) also may alter the emission spectrum of the photoluminescent material so that it appears a different color. As shown in FIGS. 1 to 18, for example, the additional t material(s) may contribute to the appearance of photoluminescent apparatus 100, 300, 400, 500, 600, 700, 800, and/or 900 by making it appear to be a pure white color, rather than an off-white color.

Any type of additional material(s) may be similarly incorporated to photoluminescent apparatus 100, 300, 400, 500, 600, 700, 800, and/or 900. As shown in FIGS. 1 to 18, for example, the additional material(s) also may comprise any combination of metallic materials, pearlescent materials, fluorescent materials, and/or colored materials, any of which may modify the brightness, duration, reflectance, aesthetic, use, and/or light emitting properties of photoluminescent apparatus 100, 300, 400, 500, 600, 700, 800, and/or 900.

Any photoluminescent apparatus 100, 300, 400, 500, 600, 700, 800, and/or 900 may be sold separately and/or as part of system including a plurality of such apparatus or kit including the same plus instructions and related accessories, such as an amount of paint, mounting accessories, additional connectors, and the like.

While principles of the present disclosure are described herein with reference to illustrative aspects, the disclosure is not limited thereto. Those having ordinary skill in the art and access to the teachings provided herein will recognize additional modifications, applications, aspects, and substitutions of equivalents that fall in the scope of the aspects described herein and thus may be covered by limitations of the claims appended hereto. Accordingly, the present disclosure is not to be considered as limited by the foregoing description.

Embodiments in which an exclusive property or privilege is claimed are defined as follows:

1. A photoluminescent apparatus comprising:
   a body made from a glow medium comprising:
     a photoluminescent material and
     a biocompatible silicone,
   the photoluminescent material being hosted in and rechargeable through the biocompatible silicone,
   wherein a total mass of the body comprises a concentration of the photoluminescent material that is greater than 20% and less than approximately 50% of the total mass;
   wherein the body comprises a first end with a male connector and a first magnet and a second end with a female connector and a second magnet, the first end being removably attachable to the second end by attracting the first magnet to the second magnet when receiving the male connector in the female connector.

2. The apparatus of claim 1, wherein the concentration of the photoluminescent material is equal to:
   between approximately 25% and approximately 45% of the total mass; or
   approximately 36.5% of the total mass.

3. The apparatus of claim 1, wherein the photoluminescent material comprises one or more of:
   zinc copper sulfides;
   Eu:SrAl2O4;
   SrAL2O4;
   Dy:Eu:SrAl2O4;
   SrAl4O7;
   Sr3Al2O6;
   SrAl12O19;
   Sr4Al14O25;
   Eu2+:SrAl2O4;
   Eu2+:SrAl2O4·Eu2+, Dy3+; and
   Sr0.95Ce0.05Mg0.05Al11.95O19.

4. The apparatus of claim 1, wherein the photoluminescent material comprises strontium aluminates doped with europium and dysprosium to produce:
   an optimum excitation wavelength ranging from 100 nm to 400 nm; and
   an emission wavelength ranging from 420 nm to 520 nm.

5. The apparatus of claim 1, wherein:
   the body comprises an elongated shape extending between the first end and the second end;
   a central portion of the elongated shape tapers toward the first end and the second end; and
   the elongated shape comprises a circular cross section extending between the first end and the second end.

6. The apparatus of claim 5, wherein the body supports its own weight when cantilevered outwardly from the first end or the second end.

7. The apparatus of claim 5, wherein the body is flexible enough to be wrapped around another object.

8. The apparatus of claim 1, comprising a microchip that is contained in the body and operable with radio waves to transfer data.

9. The apparatus of claim 1, wherein:
   the first end comprises a first opening and the second end comprises a second opening; and
   the apparatus comprises a channel extending through the body between the first opening and the second opening.

10. The apparatus of claim 9, comprising an element that is receivable in and extendable through the channel, the element comprising one of:
    a wire;
    a shape memory wire; and
    an optical fiber.

11. The apparatus of claim 9, comprising:
    an optical fiber extending through the channel,
    the apparatus comprising a light source,
    wherein the light source is contained in one of the first connector and the second connector and selectively operable to direct a light into a core of the optical fiber through an end face of the fiber at a corresponding one of the first or second connector.

12. The apparatus of claim 11, wherein the light source comprises:
    an LED;
    an UV-LED selectively operable to charge the photoluminescent material; or
    an RGB LED selectively operable to change a color of the body.

13. The apparatus of claim 11, wherein:
    the light source is contained in the first connector, aligned with a first end face of the core of the optical fiber, and selectively operable to direct the light into the first end face.

14. The apparatus of claim 13, comprising a reflector that is contained in the second connector, aligned with a second end face of the core optical fiber, and operable to reflect a portion of the light back into the second end face.

15. The apparatus of claim 13, wherein the light source comprises a second light source that is contained in the second connector, aligned with a second end face of the core of the optical fiber, and selectively operable to direct a second light into the second end face.

16. The apparatus of claim 1, wherein the glow medium comprises a fluorescent material.

17. The apparatus of claim 16, wherein the fluorescent material comprises an FWA or a chromatic colorant.

18. The apparatus of claim 17, wherein the fluorescent material is operable to alter a whiteness or brightness of the body when exposed to light.

19. The apparatus of claim 18, wherein the fluorescent material is operable to transform a wavelength of light applied to the elongated body into an optimum excitation wavelength of the photoluminescent material.

20. The apparatus of claim 19, wherein the fluorescent material alters an emission spectrum of the photoluminescent material.

* * * * *